(12) United States Patent
Sadek et al.

(10) Patent No.: US 11,834,071 B2
(45) Date of Patent: Dec. 5, 2023

(54) SYSTEM TO ACHIEVE ALGORITHM SAFETY IN HETEROGENEOUS COMPUTE PLATFORM

(71) Applicant: QUALCOMM Incorporated, San Diego, CA (US)

(72) Inventors: Ahmed Kamel Sadek, San Diego, CA (US); Avdhut Joshi, Carlsbad, CA (US); Gautam Sachdeva, San Diego, CA (US); Yoga Y Nadaraajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 771 days.

(21) Appl. No.: 16/984,312

(22) Filed: Aug. 4, 2020

(65) Prior Publication Data

US 2021/0179141 A1 Jun. 17, 2021

Related U.S. Application Data

(60) Provisional application No. 62/949,426, filed on Dec. 17, 2019.

(51) Int. Cl.
*G06F 9/50* (2006.01)
*B60W 60/00* (2020.01)
*B60W 50/14* (2020.01)
*G06F 16/23* (2019.01)

(52) U.S. Cl.
CPC ........ *B60W 60/0015* (2020.02); *B60W 50/14* (2013.01); *G06F 16/2379* (2019.01); *B60W 2050/143* (2013.01); *G06F 9/5055* (2013.01)

(58) Field of Classification Search
CPC ............. B60W 60/0015; B60W 50/14; B60W 2050/143; G06F 16/2379; G06F 9/5055; G06F 2209/503; G06F 11/1487; H04L 67/12; H04W 4/38; H04W 4/40
See application file for complete search history.

(56) References Cited

U.S. PATENT DOCUMENTS

| | | |
|---|---|---|
| 2018/0349259 A1 | 12/2018 | Mariani |
| 2019/0049912 A1 | 2/2019 | Poornachandran et al. |
| 2019/0049914 A1 | 2/2019 | Munafo et al. |
| 2019/0171538 A1* | 6/2019 | Gulati .................. G01R 31/317 |

(Continued)

FOREIGN PATENT DOCUMENTS

| | | |
|---|---|---|
| CA | 3029677 A1 | 7/2019 |
| WO | 2019112857 A1 | 6/2019 |

OTHER PUBLICATIONS

International Search Report and Written Opinion—PCT/US2020/057343—ISA/EPO—dated Feb. 3, 2021.

(Continued)

*Primary Examiner* — Sisley N Kim
(74) *Attorney, Agent, or Firm* — The Marbury Law Group, PLLC

(57) ABSTRACT

Methods, system, non-transitory media, and devices for supporting safety compliant computing in a heterogeneous computing system, such as a vehicle heterogeneous computing system are disclosed. Various aspects include methods enabling a vehicle, such as an autonomous vehicle, a semi-autonomous vehicle, etc., to achieve algorithm safety for various algorithms on a heterogeneous compute platform with various safety levels.

24 Claims, 12 Drawing Sheets

(56) References Cited

U.S. PATENT DOCUMENTS

2019/0250578 A1    8/2019  Bannow
2020/0409773 A1*  12/2020  Kwong .................. G06F 9/545

OTHER PUBLICATIONS

Ragesh N K., et al., "Pedestrian Detection in Automotive Safety: Understanding State-of-the-Art", IEEE Access, vol. 7, Jan. 28, 2019 (Jan. 28, 2019), pp. 47864-47890, XP011720293, DOI: 10.1109/ACCESS.2019.2909992 [retrieved on Apr. 19, 2019] the whole document.

Alcaid S., et al., "Software-only Diverse Redundancy on GPUs for Autonomous Driving Platforms", pp. 90-96, 25th International Symposium on On-Line Testing and Robust System Design (IOLTS 2019).

* cited by examiner

SYSTEM TO ACHIEVE ALGORITHM SAFETY IN HETEROGENEOUS COMPUTE PLATFORM

RELATED APPLICATIONS

This application claims the benefit of priority to U.S. Provisional Application No. 62/949,426, entitled "System To Achieve Algorithm Safety In Heterogeneous Compute Platform" filed Dec. 17, 2019, the entire contents of which are hereby incorporated herein by reference for all purposes.

BACKGROUND

Automobiles and trucks are becoming more intelligent as the industry moves towards deploying autonomous and semi-autonomous vehicles. Autonomous and semi-autonomous vehicles can detect information about their location and surroundings (for example, using radar, lidar, GPS, file odometers, accelerometers, cameras, and other sensors), and include control systems that interpret sensory information to identify hazards and determine navigation paths to follow. Autonomous and semi-autonomous vehicles include control systems to operate with limited or no control from an occupant or other operator of the automobile.

SUMMARY

Various aspects include methods enabling a vehicle, such as an autonomous vehicle, a semi-autonomous vehicle, etc., to achieve algorithm safety for various algorithms on a heterogeneous compute platform with various safety levels.

Various aspects include methods for supporting safety compliant computing in heterogeneous computing systems, such as vehicle heterogeneous computing systems, that may include receiving an indication to run an algorithm requiring safety compliance, such as a vehicle algorithm requiring safety compliance, in the heterogeneous computing system, determining whether a non-safety compliant computing unit of the heterogeneous computing system is preferred for running the algorithm, and modifying execution of the algorithm to perform a portion of the algorithm using the non-safety compliant computing unit of the heterogeneous computing system and perform another portion of the algorithm using a safety compliant computing unit of the heterogeneous computing system in response to determining that the non-safety compliant computing unit of the heterogeneous computing system is preferred for running the algorithm. In some aspects, modifying execution of the algorithm to perform a portion of the algorithm using the non-safety compliant computing unit of the heterogeneous computing system and perform another portion of the algorithm using a safety compliant computing unit of the heterogeneous computing system may include modifying execution of the algorithm to create a lighter version of the algorithm for running on the safety compliant computing unit of the heterogeneous computing system.

Some aspects may further include running the algorithm on the non-safety compliant computing unit of the heterogeneous computing system to generate a finer output for a dataset, running the lighter version of the algorithm on the safety compliant computing unit of the heterogeneous computing system to generate a coarse output for the dataset, determining whether the finer output and the coarse output match, and generating an alarm in response to determining that the finer output and the coarse output do not match.

Some aspects may further include running the algorithm on the non-safety compliant computing unit of the heterogeneous computing system to generate a finer output for a dataset, running the lighter version of the algorithm on the safety compliant computing unit on randomly sampled portions of the dataset to generate a coarse output for the dataset for the randomly sampled portions, determining whether the coarse outputs and the finer outputs for the randomly sampled portions match, and generating an alarm in response to determining that the coarse outputs and the finer outputs for the randomly sampled portions do not match.

In some aspects, modifying execution of the algorithm to perform a portion of the algorithm using the non-safety compliant computing unit of the heterogeneous computing system and perform another portion of the algorithm using a safety compliant computing unit of the heterogeneous computing system may include identifying critical portions of a dataset, running the algorithm on the safety compliant computing unit of the heterogeneous computing system to generate a finer output for the identified critical portions of the dataset, and running the algorithm on the non-safety compliant computing unit of the heterogeneous computing system to generate a finer output for all other portions of the dataset.

Various aspects include methods for supporting safety compliant computing in heterogeneous computing systems, such as vehicle heterogeneous computing systems, that may include receiving an indication to run an algorithm requiring safety compliance, such as a vehicle algorithm requiring safety compliance, in the heterogeneous computing system, determining whether a non-safety compliant computing unit of the heterogeneous computing system is preferred for running the algorithm, modifying execution of the algorithm to create a lighter version of the algorithm in response to determining that the non-safety compliant computing unit of the heterogeneous computing system is preferred for running the algorithm, identifying important portions of a dataset, running the algorithm on the safety compliant computing unit of the heterogeneous computing system to generate a finer output for the identified important portions of the dataset, and running the lighter version of the algorithm on the safety compliant computing unit of the heterogeneous computing system to generate a coarse output for all other portions of the dataset.

In various aspects, the heterogeneous computing system, such as the vehicle heterogeneous computing system, may be a system-on-chip. In various aspects, the safety compliant computing unit may be a central processing unit or a digital signal processing unit and the non-safety compliant computing unit is a graphics processing unit. In various aspects, the heterogeneous computing system may be a vehicle heterogeneous computing system and the algorithm requiring safety compliance may be a vehicle algorithm requiring safety compliance. In various embodiments, the vehicle algorithm requiring safety compliance may be a vehicle algorithm requiring automotive safety integrity level B (ASIL B) compliance.

Further aspects include a vehicle including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device for use in a vehicle and configured to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1A:
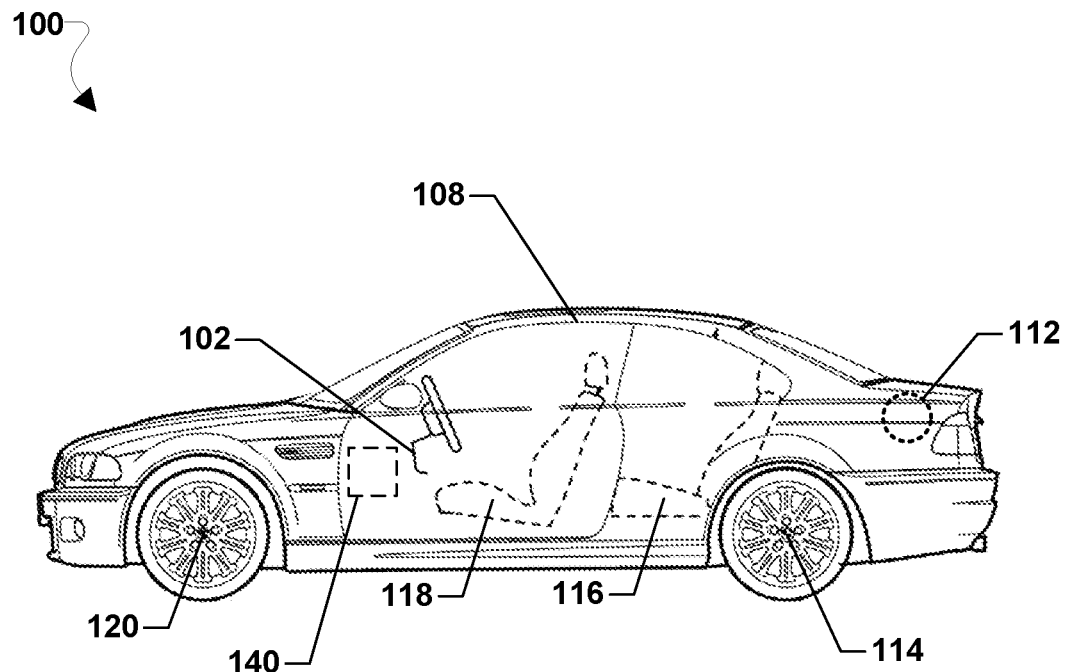
FIGS. 1A and 1B are component block diagrams illustrating a vehicle suitable for implementing various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Various embodiments may enable a vehicle, such as an autonomous vehicle, a semi-autonomous vehicle, etc., to achieve algorithm safety for various algorithms on a heterogeneous compute platform with various safety levels. Various embodiments may enable a non-safety compliant computing unit to be used at least in part for executing safety-critical functions. As some processes may be more efficiently performed on non-safety compliant computing units than on safety compliant computing units, various embodiments may improve processing efficiency for a heterogeneous compute platform by using non-safety compliant computing units to more efficiently execute safety-critical functions while achieving the same algorithm safety that would have been achieved by exclusively using safety compliant computing units.

The surface transportation industry has increasingly looked to leverage the growing capabilities of cellular and wireless communication technologies through the adoption of Intelligent Transportation Systems (ITS) technologies to increase intercommunication and safety for both driver-operated vehicles and autonomous vehicles. The cellular vehicle-to-everything (C-V2X) protocol defined by the 3rd Generation Partnership Project (3GPP) supports ITS technologies and serves as the foundation for vehicles to communicate directly with the communication devices around them.

C-V2X defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V21), and vehicle-to-pedestrian (V2P), and that provides enhanced communication range and reliability in the dedicated ITS 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G) (e.g., 5G New Radio (5G NR) systems, etc.), etc.

The term "system-on-chip" (SOC) is used herein to refer to a set of interconnected electronic circuits typically, but not exclusively, including one or more processors, a memory, and a communication interface. The SOC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SOC may further embody other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SOCs may be integrated circuits (ICs) configured such that the components of the ICs reside on the same substrate, such as a single piece of semiconductor material (e.g., silicon, etc.).

The term "safety compliant computing unit" is used herein to refer to a computing unit in compliance with automotive safety integrity levels. A safety compliant computing unit may be a computing unit in compliance with Automotive Safety Integrity Levels (ASILs) for automobiles as defined in International Organization for Standardization (ISO) standard ISO 26262 that defines ASILs for automobiles, such as ASIL A, ASIL B, ASIL C, ASIL D, etc. The term "non-safety compliant computing unit" is used herein to refer to a computing unit that is not in compliance with automotive safety integrity levels, has not been certified to ASIL A or ASIL B levels, or that has a safety level below ASIL B.

Various embodiments include methods, vehicles, vehicle management systems, and processing devices configured to implement the methods for achieving algorithm safety for various algorithms on a heterogeneous compute platform with various safety levels for vehicles, such as autonomous vehicles, semi-autonomous vehicles, driver-operated vehicles, etc. Various embodiments include methods, vehicles, vehicle management systems, and processing devices configured to implement the methods for achieving algorithm safety for various algorithms on a heterogeneous compute platform with various safety levels for a vehicle, such as an autonomous vehicle, semi-autonomous vehicle, driver-operated vehicle, etc.

Autonomous and semi-autonomous vehicles, such as cars and, trucks, tour buses, etc., are becoming a reality on city streets. Autonomous and semi-autonomous vehicles typically include a plurality of sensors, including cameras, radar, and lidar, that collect information about the environment surrounding the vehicle. For example, such collected information may enable the vehicle to recognize the roadway, identify objects to avoid, and track the movement and future position of other vehicles to enable partial or fully autonomous navigation.

Automotive system-on-chips (SOCs) may be used for safety critical applications, such as advanced driver assistance systems or autonomous driving systems, and often consist of multiple computing units, such as a multi-core central processing unit (CPU), a graphics processing unit (GPU), digital signal processing unit (DSP), and neural processing unit (NPU). Some of these components are designed to meet safety standards, such as the safety standards defined in International Organization for Standardization (ISO) standard ISO 26262 that defines Automotive Safety Integrity Levels (ASILs) for automobiles, such as ASIL A, ASIL B, ASIL C, ASIL D, etc.), while other of these components in the same heterogeneous computing system may not meet the safety standards (or not meet the same level of safety standards) due to cost, engineering, or other constraints. Various embodiments provide systems, methods, and devices to achieve algorithm safety for various algorithms on a heterogeneous compute platform with various safety levels.

Various embodiments may provide a method for supporting safety compliant computing in heterogeneous computing systems, such as vehicle heterogeneous computing systems. A heterogeneous computing system may be a computing system including one or more computing units that may be safety compliant (e.g., a computing unit in compliance with automotive safety integrity levels, such as automotive safety integrity level B (ASIL B), ASIL C, etc.) and one or more computing unit that may not be safety compliant (e.g., a computing unit that is not in compliance with automotive safety integrity levels or has a safety level below ASIL B, etc.). In various embodiments, the heterogeneous computing system may be a SOC, such as a SOC in a vehicle. Various embodiments, may include receiving an indication to run an algorithm, such as a vehicle algorithm, requiring safety compliance (e.g., ASIL B compliance, ASIL C compliance, etc.) at the heterogeneous computing system, such as the vehicle heterogeneous computing system. Various embodiments may include determining whether a non-safety compliant computing unit of the heterogeneous computing system, such as the vehicle heterogeneous computing system, is preferred for running the algorithm, such as the vehicle algorithm. The determination that a non-safety compliant computing unit is preferred for running the algorithm, such as the vehicle algorithm, may be based on the nature of the algorithm. For example, algorithms requiring a series of parallel operations may be preferable for running on a GPU. As another example, highly vectorized algorithms may be preferable for running on a DSP. The determination of the computing unit may be controlled by a setting associated with the algorithm and/or may be determined at runtime for the algorithm based on the state of the computing units in the system (e.g., estimated latency, etc.), attributes of a data set to be run with the algorithm, or any other consideration.

Various embodiments may include modifying execution of the algorithm, such as the vehicle algorithm, to at least partially leverage a safety compliant computing unit of the heterogeneous computing system, such as the vehicle heterogeneous computing system in running the algorithm, such as the vehicle algorithm, in response to determining that the non-safety compliant computing unit of the heterogeneous computing system, such as the vehicle heterogeneous computing system, is preferred for running the algorithm, such as the vehicle algorithm. In some embodiments, modifying execution of the algorithm, such as the vehicle algorithm, to at least partially leverage the safety compliant computing unit of the vehicle heterogeneous computing system in running the algorithm, such as the vehicle algorithm, in response to determining that the non-safety compliant computing unit of the heterogeneous computing system, such as the vehicle heterogeneous computing system, is preferred for running the algorithm, such as the vehicle algorithm, may include modifying execution of the algorithm, such as the vehicle algorithm, to create a lighter version of the algorithm, such as a lighter version of the vehicle algorithm, for running at least partially on the safety compliant computing unit of the heterogeneous computing system, such as the vehicle heterogeneous computing system, in response to determining that the non-safety compliant computing unit of the heterogeneous computing system, such as the vehicle heterogeneous computing system, is preferred for running the algorithm, such as the vehicle algorithm. The lighter version of the algorithm, such as the lighter version of the vehicle algorithm, may be a version of the algorithm that requires fewer computing resources to execute in comparison to a full version of the algorithm, such as the vehicle algorithm. For example, a full version of the algorithm, such as the full version of the vehicle algorithm, may use a grid or filter setting that is of a fine granularity (or that produces a higher resolution) and a lighter version of the algorithm, such as the lighter version of the vehicle algorithm, may use a grid or filter setting that is of a coarser granularity (or that produces a lower resolution).

In some embodiments, modifying execution of the algorithm, such as the vehicle algorithm, to at least partially leverage the safety compliant computing unit of the vehicle heterogeneous computing system in running the algorithm, such as the vehicle algorithm, in response to determining that the non-safety compliant computing unit of the heterogeneous computing system, such as the vehicle heterogeneous computing system, is preferred for running the algorithm, such as the vehicle algorithm, may include identifying critical portions of a dataset. In various embodiments, critical portions of a dataset may be portions of a dataset likely to be associated with safety, such as grid sections including pedestrians, data related to avoiding accidents, etc. Various embodiments may include running the algorithm, such as the vehicle algorithm, on the safety compliant computing unit of the heterogeneous computing system, such as the vehicle heterogeneous computing system, to generate a finer output for the identified critical portions of the dataset and running the algorithm, such as the vehicle algorithm, on the non-safety compliant computing unit of the heterogeneous computing system, such as the vehicle heterogeneous computing system, to generate a finer output for all other portions of the dataset.

Various embodiments may include running the algorithm, such as the vehicle algorithm, on the non-safety compliant computing unit of the heterogeneous computing system, such as the vehicle heterogeneous computing system, to generate a finer output for a dataset, running the lighter version of the algorithm, such as the lighter version of the vehicle algorithm, on the safety compliant computing unit of the heterogeneous computing system, such as the vehicle heterogeneous computing system, to generate a coarse output for the dataset, determining whether the finer output and the coarse output match, and generating an alarm in response to determining that the finer output and the coarse output do not match. In various embodiments, determining whether the finer output and the coarse output match may include various operations to determine the portions match, such as comparing the portions, computing hashes of the portions, etc.

Various embodiments may include running the lighter version of the algorithm, such as the lighter version of the vehicle algorithm, on the safety compliant computing unit of the heterogeneous computing system, such as the vehicle heterogeneous computing system, to generate a coarse output for a dataset, identifying portions of the coarse output that are urgent portions, running the algorithm, such as the vehicle algorithm, on the non-safety compliant computing unit at least twice on portions of the dataset corresponding to identified urgent portions, to generate at least a first finer output and a second finer output, determining whether the first and the second finer outputs match, generating an alarm in response to determining that the first and the second finer outputs do not match, and substituting one of the first finer output or the second finer output for the identified urgent portions of the coarse output in response to determining that the first and the second finer outputs do match. In various embodiments, determining whether the first and the second finer outputs match may include various operations to determine the outputs match, such as comparing the outputs, computing hashes of the outputs, etc.

Various embodiments may include running the algorithm, such as the vehicle algorithm, on the non-safety compliant computing unit of the heterogeneous computing system, such as the vehicle heterogeneous computing system, to generate a finer output for a dataset, running the lighter version of the algorithm, such as the lighter version of the vehicle algorithm, on the safety compliant computing unit on randomly sampled portions of the dataset to generate a coarse output for the dataset for the randomly sampled portions, determining whether the coarse outputs and the finer outputs for the randomly sampled portions match, and generating an alarm in response to determining that the coarse outputs and the finer outputs for the randomly sampled portions do not match. In various embodiments, determining whether the coarse outputs and the finer outputs for the randomly sampled portions match may include various operations to determine the outputs match, such as comparing the outputs, computing hashes of the outputs, etc.

Various embodiments may leverage redundant computing processes in which some or all of an algorithm may be computed two or more times by the same computing unit or by different computing unit to determine whether that output matches. Matching output may validate the outputs and mismatches may indicate an error may have occurred.

Sensor Fusion grid is one example automotive algorithm that may be suitable for use with the various embodiments. Sensor Fusion is an automotive algorithm that estimates various properties of each cell of spatial grid around the autonomous vehicle or ego vehicle. These estimated properties may be occupancy, drivability, visibility, semantic class etc. This may be achieved by combining information from various sensors. An example algorithm which estimates the visibility property in the sensor fusion grid may illustrate various aspects of the various embodiments. For example, the visibility grid is a grid that describes whether a given location on a high definition map is visible to any of the sensor available on the car. The grid cells of the grid are defined by coordinates on a high definition map. One example of an algorithm to compute the visibility grid can be explained according to the following operations, but different variations for the operations of the algorithm may be used in various aspects. In a first operation, a grid is generated with points within a given radius, it can be from an HD-map or an online generated map. In a second operation, a list of dynamic objects is obtained from the sensor fusion pipeline. In a third operation, the points are then filtered by whether the point lies within the field of view of a sensor. In a fourth operation, then a ray is traced from the point to the sensor currently under consideration. In a fifth operation, the ray is then checked for any intersection with a dynamic object on the road. In a sixth operation, if the ray does not intersect with any dynamic object, or if the point lies within the dynamic object then that point is deemed to be visible to the sensor and hence to the sensor fusion pipeline. In a seventh operation, if the ray intersects a dynamic object, then the point is considered to be occluded from the view of the sensor and thus not visible to the sensor fusion pipeline. The algorithm may also include tracking different dynamic objects in the scene as pedestrians, cars, cyclists, motorcycles, trucks, animals crossing the street, an object flying from a car, etc.

As an example, the occlusion grid algorithm may be an automotive algorithm suitable for use with the various embodiment methods for supporting safety compliant computing in vehicle heterogeneous computing systems and may illustrate various operations of the various embodiments. However, the algorithm operations discussed with reference to the occlusion grid algorithm and Sensor Fusion are provided merely as examples and the various embodiments may be suitable for use with other algorithms, such as grid fusion algorithms, motion planning algorithms, Monte Carlo sampling algorithms, etc. Turning to the example of the occlusion grid algorithm as a ray tracing operation may be key for this algorithm, which is a very GPU friendly operation, it may be most efficient to run the occlusion algorithm on the GPU. However, if the GPU does not meet Automotive Safety Integrity Level (ASIL) requirements (e.g., the GPU does not meet ASIL-B safety requirements), the occlusion grid algorithm may not be deployed on the GPU as the occlusion grid algorithm may require deployment on hardware meeting ASIL requirements (e.g., meeting ASIL B safety requirements). In order to circumvent this problem, various embodiment methods to achieve algorithm safety may be used at runtime of the occlusion grid algorithm. In the following examples, the CPU or DSP may be a safety compliant computing unit (e.g., an ASIL B compliant computing unit) and the GPU may be a non-safety compliant computing unit (e.g., a computing unit that is not ASIL B compliant).

As one example, a coarse-fine grid method may be used in various embodiments. Since the CPU or the DSP may be an ASIL-B compliant component, a coarse grid (e.g., a grid of 5 meter by 5 meter grid sections) may be run on the CPU or DSP while simultaneously running a fine grid (e.g., a grid of 0.5 meter by 0.5 meter grid sections) on the GPU. The coarse grid may be cheaper in computation and may indicate whether the larger cell has any occlusion (non-visibility). In the case where occlusion is observed in the area of interest, the system may fetch the finer result from GPU. If the finer results and the coarser results don't agree (e.g., both do not observe an occlusion, etc.), the system may raise a malfunction alarm to notify the upper layers to take safety actions (e.g., warn the driver, perform evasive maneuvers, etc.).

As another example, a selective grid method may be used in various embodiments. A coarse grid (e.g., a grid of 5 meter by 5 meter grid sections) may be run on the CPU or the DSP. The system may determine the grid tiles that are urgent to understand at finer details (e.g., grid tiles having a pedestrian, or small object therein). The system may take the important tiles and run them twice on the GPU using a fine grid (e.g., a grid of 0.5 meter by 0.5 meter grid sections). The system may check if the two runs on the GPU match. If the two runs on the GPU match, the fine grid output for those tiles may be used in subsequent steps. If the two runs on the GPU do not match, an alarm may be raised.

As another example, a random sampling method may be used in various embodiments. In random sampling, the full algorithm may be deployed at a finer scale on the GPU to compute the visibility values for all cells. A few of these cells may be randomly sampled for recompute of their properties on the CPU or the DSP. The randomly sampled output computed on ASIL safe computing unit, such as the CPU or the DSP, may be verified against the values generated from the GPU. If the values don't match, the system may raise a malfunction alarm to notify the upper layers to take safe actions (warn the driver, take evasive maneuvers, etc.).

As another example, preference computing methods may be used in various embodiments. Grid cells that are identified as more important may be computed on ASIL-B computing units and less important/critical grid cells computed on non-ASIL-B computing units. As a specific example, during lane change planning, the target lane grid cells are more important and can be computed on the ASIL-B compliant computing unit (e.g., the CPU). Other grid cells may be computed on the non-ASIL B compliant computing unit (e.g., the GPU).

As another example, adaptive grid cell size may be used in various embodiments. For example, as the longitudinal distance of the grid cell from the ego vehicle increases, the grid cell size may be increased based on the distance to reduce the load on the ASIL-B computing unit.

Various examples are discussed herein with reference to vehicles, vehicle heterogeneous computing systems, and vehicle algorithms to better illustrate various aspects of various embodiments. However, the discussions of vehicles, vehicle heterogeneous computing systems, and vehicle algorithms are merely examples and are not intended to limit the scope of the disclosure or claims. Other devices, other heterogeneous computing systems, and/or other algorithms may be substituted for the vehicles, vehicle heterogeneous computing systems, and vehicle algorithms in the various examples.

Figure 1B:
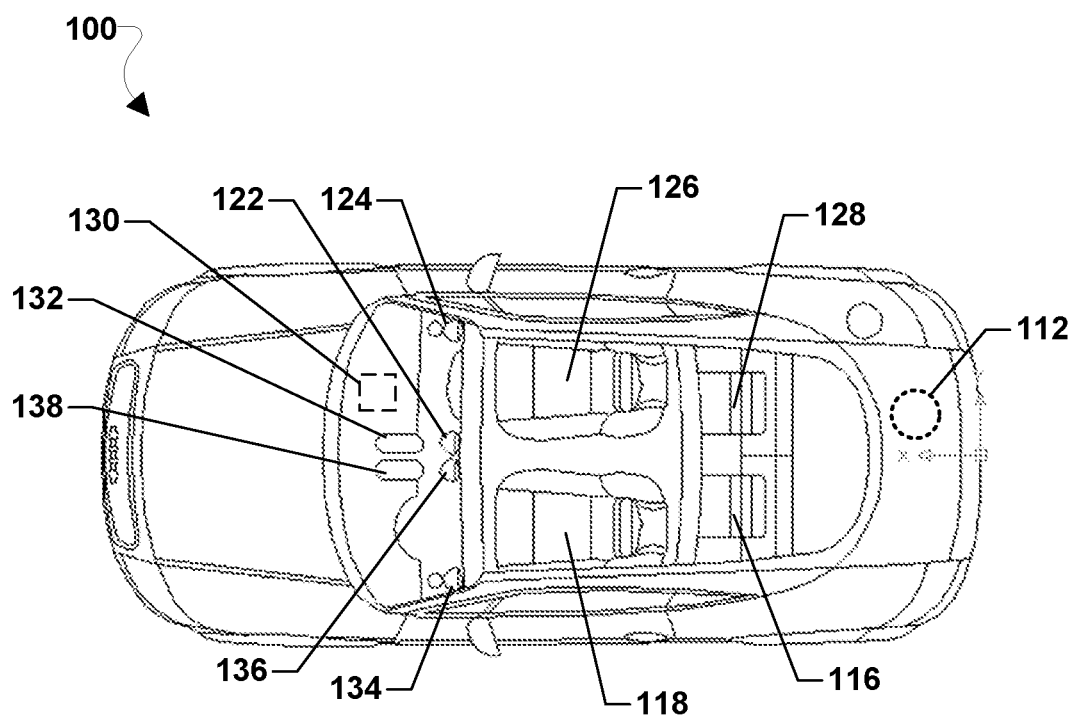

Various embodiments may be implemented within a variety of vehicles, an example vehicle 100 of which is illustrated in FIGS. 1A and 1B. With reference to FIGS. 1A and 1B, a vehicle 100 may include a control unit 140 and a plurality of sensors 102-138, including satellite geopositioning system receivers 108, occupancy sensors 112, 116, 118, 126, 128, tire pressure sensors 114, 120, cameras 122, 136, microphones 124, 134, impact sensors 130, radar 132, and lidar 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured with processor-executable instructions to perform various embodiments using information received from various sensors, particularly the cameras 122, 136. In some embodiments, the control unit 140 may supplement the processing of camera images using distance and relative position (e.g., relative bearing angle) that may be obtained from radar 132 and/or lidar 138 sensors. The control unit 140 may further be configured to control steering, breaking and speed of the vehicle 100 when operating in an autonomous or semi-autonomous mode using information regarding other vehicles determined using various embodiments.

Figure 1C:
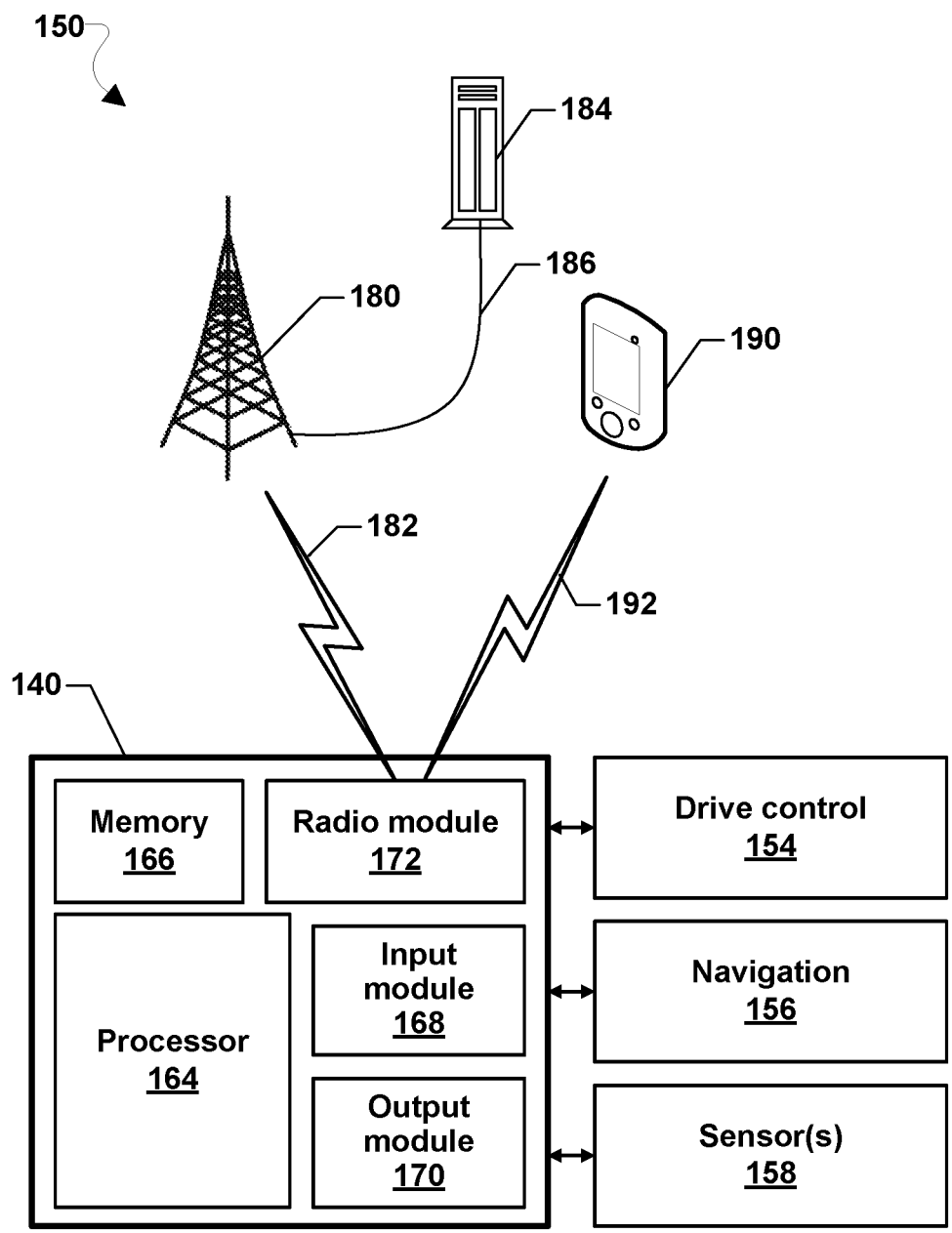
FIG. 1C is a component block diagram illustrating components of a vehicle suitable for implementing various embodiments.

FIG. 1C is a component block diagram illustrating a system 150 of components and support systems suitable for implementing various embodiments. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a radio module 172. The control unit 140 may be coupled to and configured to control drive control components 154, navigation components 156, and one or more sensors 158 of the vehicle 100.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The control unit 140 may include a processor 164 that may be configured with processor-executable instructions to control maneuvering, navigation, and/or other operations of the vehicle 100, including operations of various embodiments. The processor 164 may be coupled to the memory 166. The control unit 162 may include the input module 168, the output module 170, and the radio module 172.

The radio module 172 may be configured for wireless communication. The radio module 172 may exchange signals 182 (e.g., command signals for controlling maneuvering, signals from navigation facilities, etc.) with a network transceiver 180, and may provide the signals 182 to the processor 164 and/or the navigation unit 156. In some embodiments, the radio module 172 may enable the vehicle 100 to communicate with a wireless communication device 190 through a wireless communication link 192. The wireless communication link 192 may be a bidirectional or unidirectional communication link, and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, steering elements, flight control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156, and may receive data from the navigation components 156 and be configured to use such data to determine the present position and orientation of the vehicle 100, as well as an appropriate course toward a destination. In various embodiments, the navigation components 156 may include or be coupled to a global navigation satellite system (GNSS) receiver system (e.g., one or more Global Positioning System (GPS) receivers) enabling the vehicle 100 to determine the vehicle's current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control elements 154, the processor 164 may control the vehicle 100 to navigate and maneuver. The processor 164 and/or the navigation components 156 may be configured to communicate with a server 184 on a network 186 (e.g., the Internet) using a wireless connection 182 with a cellular data network 180 to receive commands to control maneuvering, receive data useful in navigation, provide real-time position reports, and assess other data.

The control unit 162 may be coupled to one or more sensors 158. The sensor(s) 158 may include the sensors 102-138 as described, and may the configured to provide a variety of data to the processor 164.

While the control unit 140 is described as including separate components, in some embodiments some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various embodiments when installed into a vehicle.

Figure 2A:
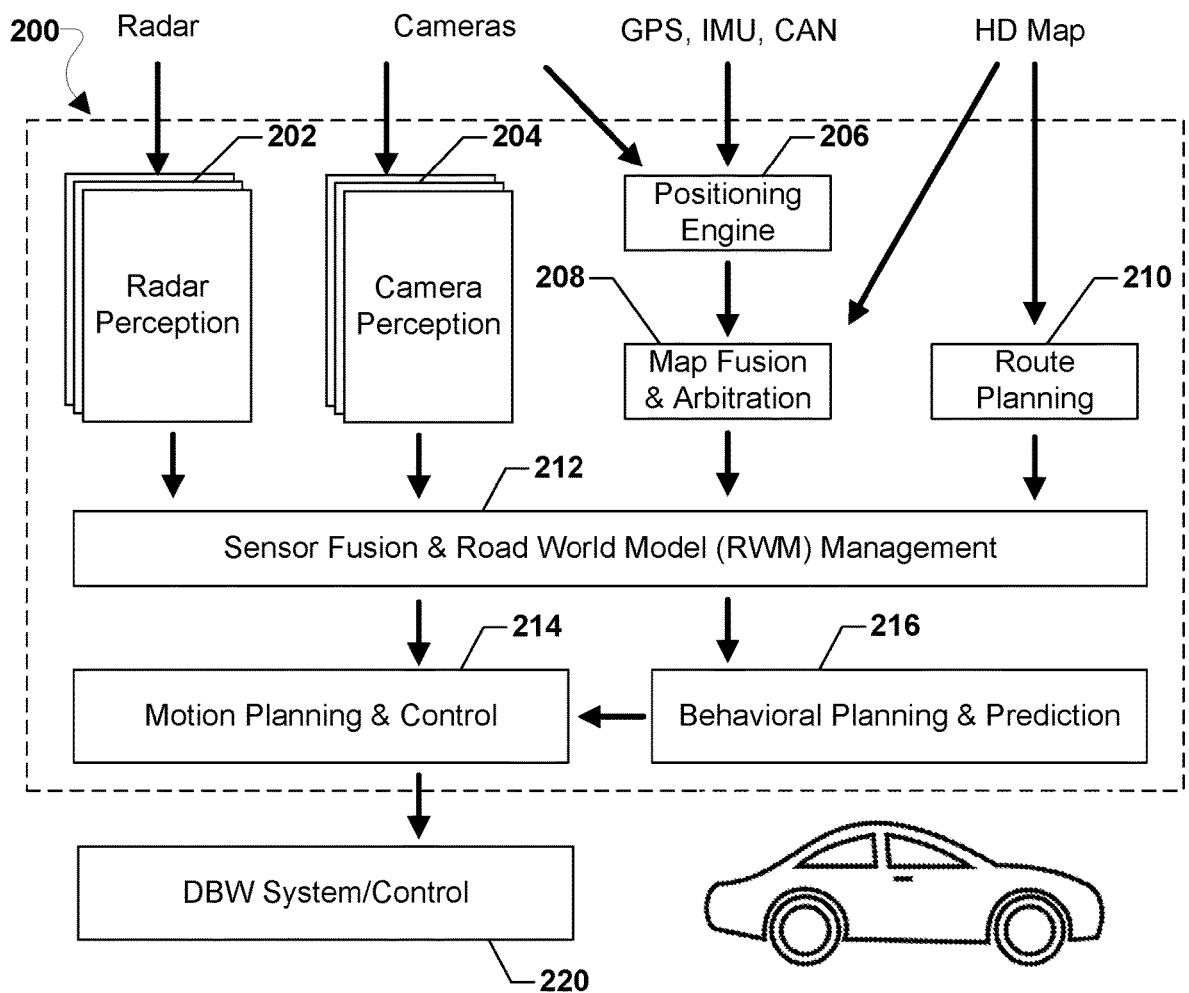
FIG. 2A is a component block diagram illustrating components of an example vehicle management system according to various embodiments.

FIG. 2A illustrates an example of subsystems, computational elements, computing devices or units within a vehicle management system 200, which may be utilized within a vehicle 100. With reference to FIGS. 1A-2A, in some embodiments, the various computational elements, computing devices or units within vehicle management system 200 may be implemented within a system of interconnected computing devices (i.e., subsystems), that communicate data and commands to each other (e.g., indicated by the arrows in FIG. 2A). In other embodiments, the various computational elements, computing devices or units within vehicle management system 200 may be implemented within a single computing device, such as separate threads, processes, algorithms or computational elements. Therefore, each subsystem/computational element illustrated in FIG. 2A is also generally referred to herein as "layer" within a computational "stack" that constitutes the vehicle management system 200. However, the use of the terms layer and stack in describing various embodiments are not intended to imply or require that the corresponding functionality is implemented within a single autonomous (or semi-autonomous) vehicle management system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

In various embodiments, the vehicle management system stack 200 may include a radar perception layer 202, a camera perception layer 204, a positioning engine layer 206, a map fusion and arbitration layer 208, a route planning layer 210, sensor fusion and road world model (RWM) management layer 212, motion planning and control layer 214, and behavioral planning and prediction layer 216. The layers 202-216 are merely examples of some layers in one example configuration of the vehicle management system stack 200. In other configurations consistent with various embodiments, other layers may be included, such as additional layers for other perception sensors (e.g., LIDAR perception layer, etc.), additional layers for planning and/or control, additional layers for modeling, etc., and/or certain of the layers 202-216 may be excluded from the vehicle management system stack 200. Each of the layers 202-216 may exchange data, computational results and commands as illustrated by the arrows in FIG. 2A. Further, the vehicle management system stack 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system stack 200 may output vehicle control commands or signals to the drive by wire (DBW) system/control unit 220, which is a system, subsystem or computing device that interfaces directly with vehicle steering, throttle and brake controls. The configuration of the vehicle management system stack 200 and DBW system/control unit 220 illustrated in FIG. 2A is merely an example configuration and other configurations of a vehicle management system and other vehicle components may be used in the various embodiments. As an example, the configuration of the vehicle management system stack 200 and DBW system/control unit 220 illustrated in FIG. 2A may be used in a vehicle configured for autonomous or semi-autonomous operation while a different configuration may be used in a non-autonomous vehicle.

The radar perception layer 202 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 202 may include use of neural network processing and artificial intelligence methods to recognize objects and vehicles, and pass such information on to the sensor fusion and RWM management layer 212.

The camera perception layer 204 may receive data from one or more cameras, such as cameras (e.g., 122, 136), and process the data to recognize and determine locations of other vehicles and objects within a vicinity of the vehicle 100. The camera perception layer 204 may include use of neural network processing and artificial intelligence methods to recognize objects and vehicles, and pass such information on to the sensor fusion and RWM management layer 212.

The positioning engine layer 206 may receive data from various sensors and process the data to determine a position of the vehicle 100. The various sensors may include, but is not limited to, GPS sensor, an IMU, and/or other sensors connected via a CAN bus. The positioning engine layer 206 may also utilize inputs from one or more cameras, such as cameras (e.g., 122, 136) and/or any other available sensor, such as radars, LIDARs, etc.

The map fusion and arbitration layer 208 may access data within a high definition (HD) map database and receive output received from the positioning engine layer 206 and process the data to further determine the position of the vehicle 100 within the map, such as location within a lane of traffic, position within a street map, etc. The HD map database may be stored in a memory (e.g., memory 166). For example, the map fusion and arbitration layer 208 may convert latitude and longitude information from GPS into locations within a surface map of roads contained in the HD map database. GPS position fixes include errors, so the map fusion and arbitration layer 208 may function to determine a best guess location of the vehicle within a roadway based upon an arbitration between the GPS coordinates and the HD map data. For example, while GPS coordinates may place the vehicle near the middle of a two-lane road in the HD map, the map fusion and arbitration layer 208 may determine from the direction of travel that the vehicle is most likely aligned with the travel lane consistent with the direction of travel. The map fusion and arbitration layer 208 may pass map-based location information to the sensor fusion and RWM management layer 212.

The route planning layer 210 may utilize the HD map, as well as inputs from an operator or dispatcher to plan a route to be followed by the vehicle 100 to a particular destination. The route planning layer 210 may pass map-based location information to the sensor fusion and RWM management layer 212. However, the use of a prior map by other layers, such as the sensor fusion and RWM management layer 212, etc., is not required. For example, other stacks may operate and/or control the vehicle based on perceptual data alone without a provided map, constructing lanes, boundaries, and the notion of a local map as perceptual data is received.

The sensor fusion and RWM management layer 212 may receive data and outputs produced by the radar perception layer 202, camera perception layer 204, map fusion and arbitration layer 208, and route planning layer 210, and use some or all of such inputs to estimate or refine the location and state of the vehicle 100 in relation to the road, other vehicles on the road, and other objects within a vicinity of the vehicle 100. For example, the sensor fusion and RWM management layer 212 may combine imagery data from the camera perception layer 204 with arbitrated map location information from the map fusion and arbitration layer 208 to refine the determined position of the vehicle within a lane of traffic. As another example, the sensor fusion and RWM management layer 212 may combine object recognition and imagery data from the camera perception layer 204 with object detection and ranging data from the radar perception layer 202 to determine and refine the relative position of other vehicles and objects in the vicinity of the vehicle. As another example, the sensor fusion and RWM management layer 212 may receive information from vehicle-to-vehicle (V2V) communications (such as via the CAN bus) regarding other vehicle positions and directions of travel, and combine that information with information from the radar perception layer 202 and the camera perception layer 204 to refine the locations and motions of other vehicles. The sensor fusion and RWM management layer 212 may output refined location and state information of the vehicle 100, as well as refined location and state information of other vehicles and objects in the vicinity of the vehicle, to the motion planning and control layer 214 and/or the behavior planning and prediction layer 216.

As a further example, the sensor fusion and RWM management layer 212 may use dynamic traffic control instructions directing the vehicle 100 to change speed, lane, direction of travel, or other navigational element(s), and combine that information with other received information to determine refined location and state information. The sensor fusion and RWM management layer 212 may output the refined location and state information of the vehicle 100, as well as refined location and state information of other vehicles and objects in the vicinity of the vehicle 100, to the motion planning and control layer 214, the behavior planning and prediction layer 216 and/or devices remote from the vehicle 100, such as a data server, other vehicles, etc., via wireless communications, such as through C-V2X connections, other wireless connections, etc.

As a still further example, the sensor fusion and RWM management layer 212 may monitor perception data from various sensors, such as perception data from a radar perception layer 202, camera perception layer 204, other perception layer, etc., and/or data from one or more sensors themselves to analyze conditions in the vehicle sensor data. The sensor fusion and RWM management layer 212 may be configured to detect conditions in the sensor data, such as sensor measurements being at, above, or below a threshold, certain types of sensor measurements occurring, etc., and may output the sensor data as part of the refined location and state information of the vehicle 100 provided to the behavior planning and prediction layer 216 and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction layer 216 of the autonomous vehicle system stack 200 may use the refined location and state information of the vehicle 100 and location and state information of other vehicles and objects output from the sensor fusion and RWM management layer 212 to predict future behaviors of other vehicles and/or objects. For example, the behavioral planning and prediction layer 216 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction layer 216 may output other vehicle and object behavior and location predictions to the motion planning and control layer 214. Additionally, the behavior planning and prediction layer 216 may use object behavior in combination with location predictions to plan and generate control signals for controlling the motion of the vehicle 100. For example, based on route planning information, refined location in the roadway information, and relative locations and motions of other vehicles, the behavior planning and prediction layer 216 may determine that the vehicle 100 needs to change lanes and accelerate, such as to maintain or achieve minimum spacing from other vehicles, and/or prepare for a turn or exit. As a result, the behavior planning and prediction layer 216 may calculate or otherwise determine a steering angle for the wheels and a change to the throttle setting to be commanded to the motion planning and control layer 214 and DBW system/control unit 220 along with such various parameters necessary to effectuate such a lane change and acceleration. One such parameter may be a computed steering wheel command angle.

The motion planning and control layer 214 may receive data and information outputs from the sensor fusion and RWM management layer 212 and other vehicle and object behavior as well as location predictions from the behavior planning and prediction layer 216, and use this information to plan and generate control signals for controlling the motion of the vehicle 100 and to verify that such control signals meet safety requirements for the vehicle 100. For example, based on route planning information, refined location in the roadway information, and relative locations and motions of other vehicles, the motion planning and control layer 214 may verify and pass various control commands or instructions to the DBW system/control unit 220.

The DBW system/control unit 220 may receive the commands or instructions from the motion planning and control layer 214 and translate such information into mechanical control signals for controlling wheel angle, brake and throttle of the vehicle 100. For example, DBW system/control unit 220 may respond to the computed steering wheel command angle by sending corresponding control signals to the steering wheel controller.

In various embodiments, the vehicle management system stack 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 216 (or in a separate layer) may determine the current or future separate distance between another vehicle (as refined by the sensor fusion and RWM management layer 212) and the vehicle (e.g., based on the world model refined by the sensor fusion and RWM management layer 212), compare that separation distance to a safe separation distance parameter stored in memory, and issue instructions to the motion planning and control layer 214 to speed up, slow down or turn if the current or predicted separation distance violates the safe separation distance parameter. As another example, safety or oversight functionality in the motion planning and control layer 214 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
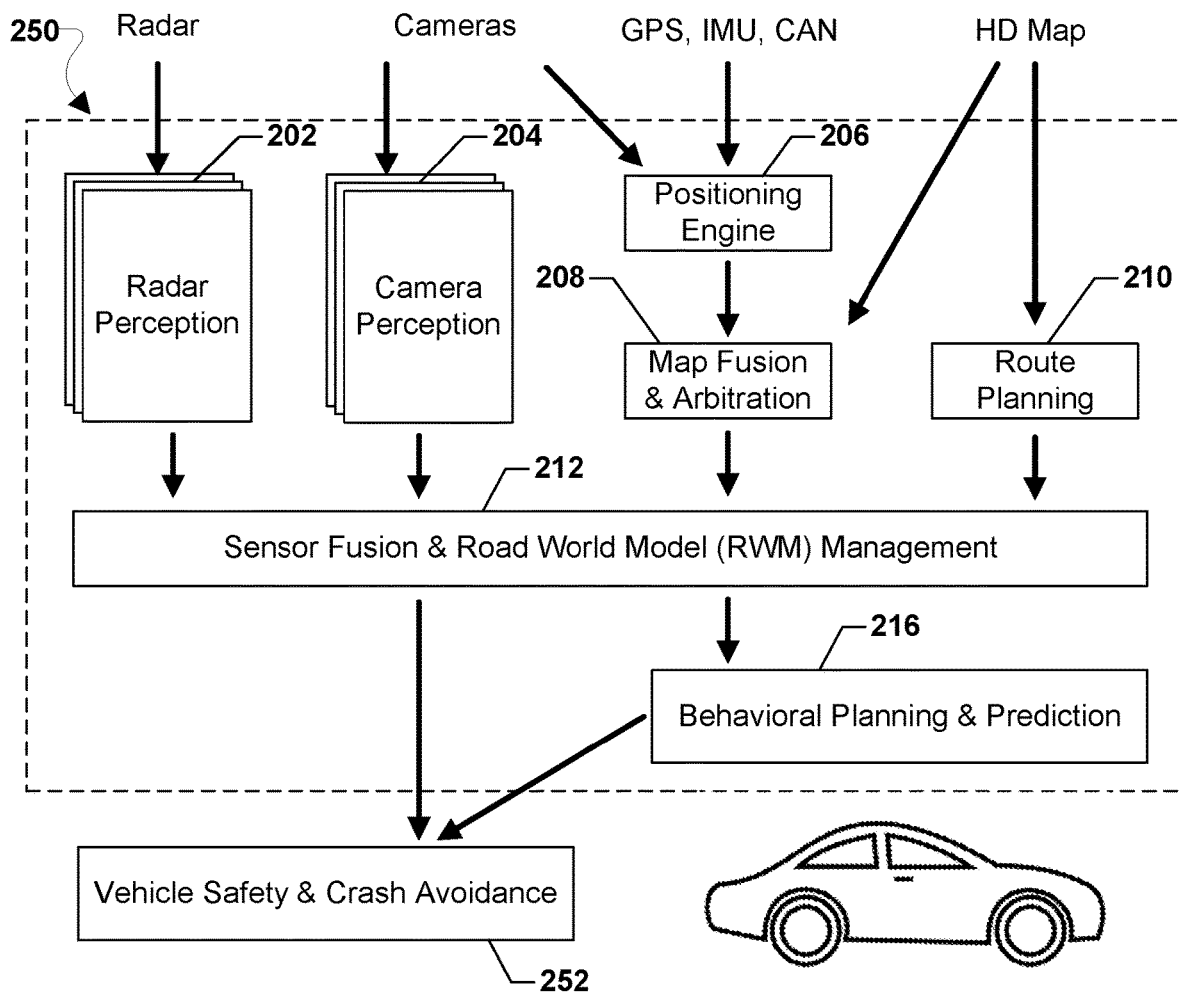
FIG. 2B is a component block diagram illustrating components of another example vehicle management system according to various embodiments.

FIG. 2B illustrates an example of subsystems, computational elements, computing devices or units within a vehicle management system 250, which may be utilized within a vehicle 100. With reference to FIGS. 1A-2B, in some embodiments, the layers 202, 204, 206, 208, 210, 212, and 216 of the vehicle management system stack 200 may be similar to those described with reference to FIG. 2A and the vehicle management system stack 250 may operate similar to the vehicle management system stack 200, except that the vehicle management system stack 250 may pass various data or instructions to a vehicle safety and crash avoidance system 252 rather than the DBW system/control unit 220. For example, the configuration of the vehicle management system stack 250 and the vehicle safety and crash avoidance system 252 illustrated in FIG. 2B may be used in a non-autonomous vehicle.

In various embodiments, the behavioral planning and prediction layer 216 and/or sensor fusion and RWM management layer 212 may output data to the vehicle safety and crash avoidance system 252. For example, the sensor fusion and RWM management layer 212 may output sensor data as part of refined location and state information of the vehicle 100 provided to the vehicle safety and crash avoidance system 252. The vehicle safety and crash avoidance system 252 may use the refined location and state information of the vehicle 100 to make safety determinations relative to the vehicle 100 and/or occupants of the vehicle 100. As another example, the behavioral planning and prediction layer 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 100 and/or occupants of the vehicle 100.

In various embodiments, the vehicle safety and crash avoidance system 252 may include functionality that performs safety checks or oversight of various commands, planning, or other decisions of various layers, as well as human driver actions, that could impact vehicle and occupant safety. In some embodiments, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as refined by the sensor fusion and RWM management layer 212) and the vehicle (e.g., based on the world model refined by the sensor fusion and RWM management layer 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter, and issue an override command and/or alarm in response to the steering wheel angle exceeding the safe wheel angle limit.

Figure 3:
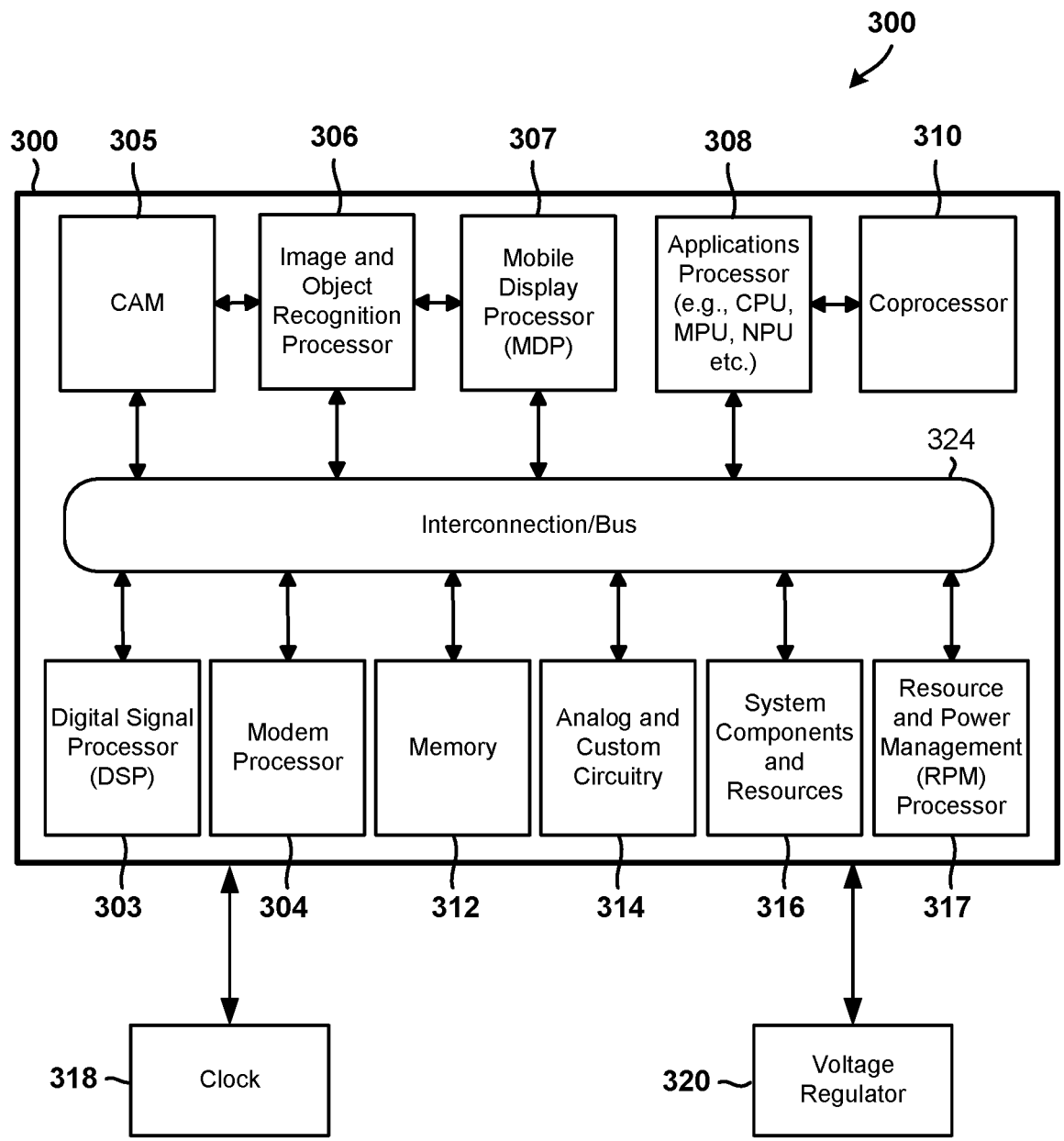
FIG. 3 is a block diagram illustrating components of an example system on chip for use in a vehicle that may be configured to broadcast, receive, and/or otherwise use intentions and/or motion plans in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), neural processing unit (NPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras 122, 136 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 122, 136) via the CAM 305 to recognize and/or identify other vehicles, and otherwise perform functions of the camera perception layer 204 as described. In some embodiments, the processor 306 may be configured to process radar or lidar data and perform functions of the radar perception layer 202 as described.

The system components and resources 316, analog and custom circuitry 314, and/or CAM 305 may include circuitry to interface with peripheral devices, such as cameras 122, 136, radar 132, lidar 138, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 4:
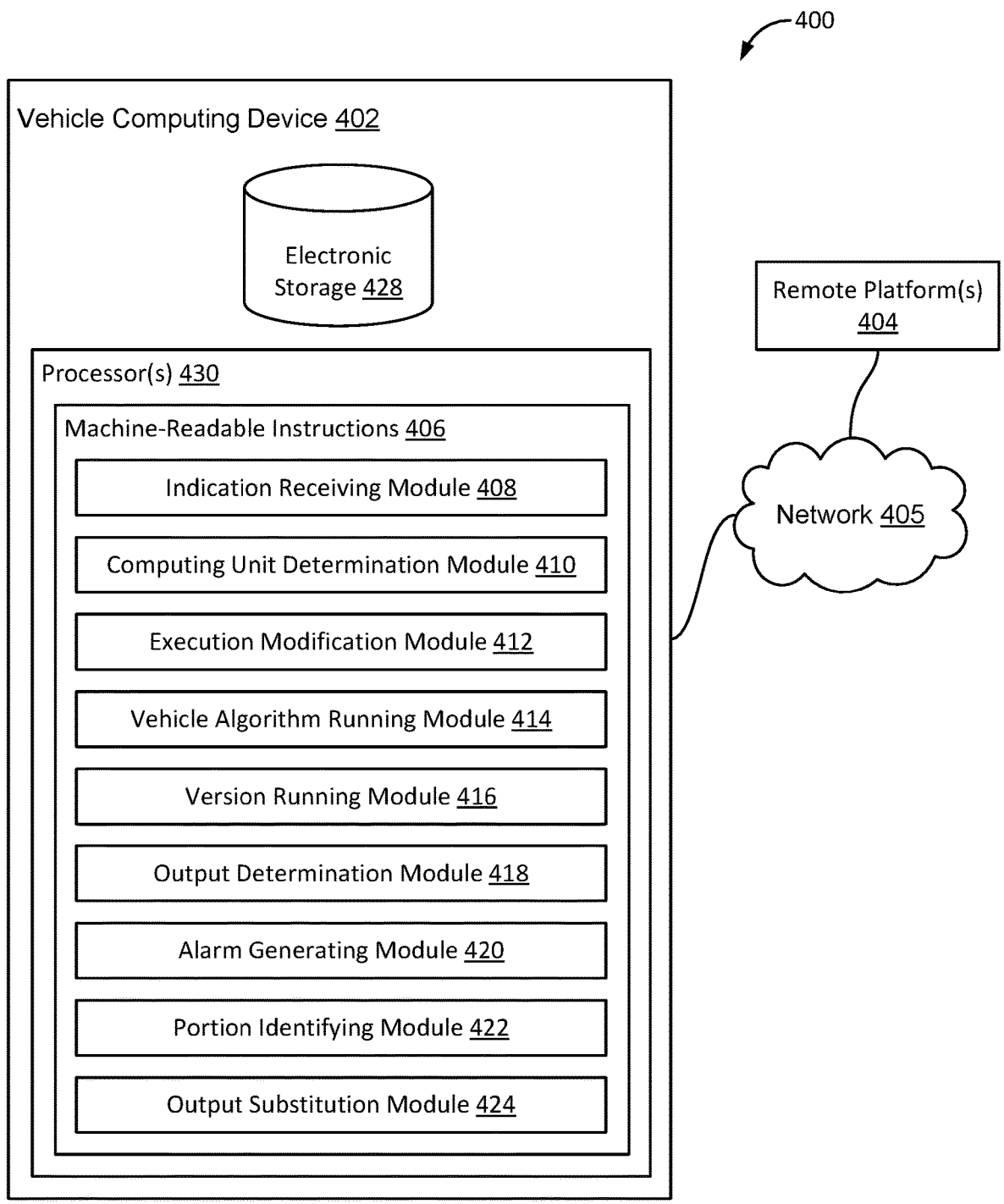
FIG. 4 shows a component block diagram of an example system configured for supporting safety compliant computing in a heterogeneous computing system, such as a vehicle heterogeneous computing system.

FIG. 4 shows a component block diagram illustrating a system 400 configured for supporting safety compliant computing in a vehicle heterogeneous computing system in accordance with various embodiments. In some embodiments, the system 400 may include one or more vehicle computing devices 402 and/or one or more remote platforms 404. With reference to FIGS. 1A-4, the vehicle computing device 402 may include a processor (e.g., 164), a processing device (e.g., 300), and/or a control unit (e.g., 104) (variously referred to as a "processor") of a vehicle (e.g., 100). The remote platform(s) 404 may include a processor (e.g., 164), a processing device (e.g., 300), a control unit (e.g., 104) (variously referred to as a "processor") of a vehicle (e.g., 100), a server (e.g., 184), and/or a wireless communication device (e.g., 190) that the vehicle computing device 402 may connect to over a network 405 (e.g., 186) or via other communication links.

The vehicle computing device 402 may be configured by machine-executable instructions 406. Machine-executable instructions 406 may include one or more instruction modules. The instruction modules may include computer program modules. The instruction modules may include one or more of an indication receiving module 408, computing unit determination module 410, execution modification module 412, vehicle algorithm running module 414, version running module 416, output determination module 418, alarm generating module 420, portion identifying module 422, output substitution module 424, and/or other instruction modules.

Indication receiving module 408 may be configured to receive an indication to run a vehicle algorithm requiring safety compliance in the vehicle heterogeneous computing system. Safety compliance may be a requirement that the algorithm run on a safety compliant device, such as an ASIL B compliant device.

Computing unit determination module 410 may be configured to determine whether a non-safety compliant computing unit of the vehicle heterogeneous computing system is preferred for running the vehicle algorithm.

Execution modification module 412 may be configured to modify execution of the vehicle algorithm to perform a part of the vehicle algorithm using the non-safety compliant computing unit of the vehicle heterogeneous computing system and perform another portion of the vehicle algorithm using a safety compliant computing unit of the vehicle heterogeneous computing system in response to determining that the non-safety compliant computing unit of the vehicle heterogeneous computing system is preferred for running the vehicle algorithm. The safety compliant computing unit may be a central processing unit or a digital signal processing unit and the non-safety compliant computing unit is a graphics processing unit. Execution modification module 412 may be configured to modify execution of the vehicle algorithm to create a lighter version of the vehicle algorithm for running on the safety compliant computing unit of the vehicle heterogeneous computing system. Execution modification module 412 may be configured to modify execution of the vehicle algorithm to create a lighter version of the vehicle algorithm in response to determining that the non-safety compliant computing unit of the vehicle heterogeneous computing system is preferred for running the vehicle algorithm.

Vehicle algorithm running module 414 may be configured to run the vehicle algorithm on the non-safety compliant computing unit of the vehicle heterogeneous computing system to generate a finer output for a dataset. Vehicle algorithm running module 414 may be configured to run the vehicle algorithm on the non-safety compliant computing unit at least twice on portions of the dataset corresponding to identified urgent portions, to generate at least a first finer output and a second finer output. Vehicle algorithm running module 414 may be configured to run the vehicle algorithm on the non-safety compliant computing unit of the vehicle heterogeneous computing system to generate a finer output for a dataset. Vehicle algorithm running module 414 may be configured to run the vehicle algorithm on the safety compliant computing unit of the vehicle heterogeneous computing system to generate a finer output for the identified critical portions of the dataset. Vehicle algorithm running module 414 may be configured to run the vehicle algorithm on the non-safety compliant computing unit of the vehicle heterogeneous computing system to generate a finer output for all other portions of the dataset. Vehicle algorithm running module 414 may be configured to run the vehicle algorithm on the safety compliant computing unit of the vehicle heterogeneous computing system to generate a finer output for the identified important portions of the dataset.

Version running module 416 may be configured to run the lighter version of the vehicle algorithm on the safety compliant computing unit of the vehicle heterogeneous computing system to generate a coarse output for the dataset. Version running module 416 may be configured to run the lighter version of the vehicle algorithm on the safety compliant computing unit of the vehicle heterogeneous computing system to generate a coarse output for a dataset. Version running module 416 may be configured to run the lighter version of the vehicle algorithm on the safety compliant computing unit on randomly sampled portions of the dataset to generate a coarse output for the dataset for the randomly sampled portions. Version running module 416 may be configured to run the lighter version of the vehicle algorithm on the safety compliant computing unit of the vehicle heterogeneous computing system to generate a coarse output for all other portions of the dataset.

Output determination module 418 may be configured to determining whether the finer output and the coarse output match. Output determination module 418 may be configured to determine whether the first and the second finer outputs match. Output determination module 418 may be configured to determine whether the coarse outputs and the finer outputs for the randomly sampled portions match.

Alarm generating module 420 may be configured to generate an alarm in response to determining that the finer output and the coarse output do not match. Alarm generating module 420 may be configured to generate an alarm in response to determining that the first and the second finer outputs do not match. Alarm generating module 420 may be configured to generate an alarm in response to determining that the coarse outputs and the finer outputs for the randomly sampled portions do not match.

Portion identifying module 422 may be configured to identify portions of the coarse output that are urgent portions. Portion identifying module 422 may be configured to identify critical portions of a dataset. Portion identifying module 422 may be configured to identify important portions of a dataset.

Output substitution module 424 may be configured to substitute one of the first finer output or the second finer output for the identified urgent portions of the coarse output in response to determining that the first and the second finer outputs do match.

In some embodiments, the vehicle heterogeneous computing system may be a SOC. In some embodiments, the required safety compliance may be ASIL B compliance.

Figure 5:
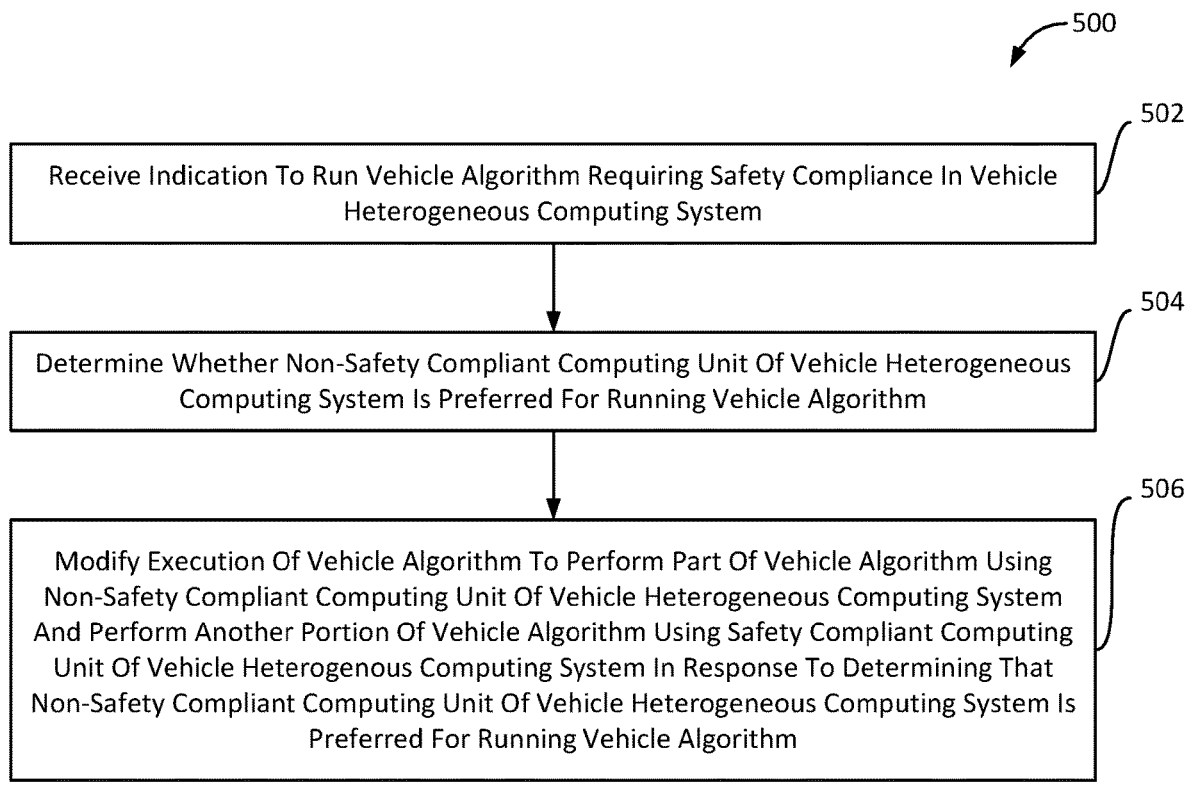
FIG. 5 is a process flow diagram illustrating a method of supporting safety compliant computing in a heterogeneous computing system, such as a vehicle heterogeneous computing system.

FIG. 5 illustrates a method 500 for supporting safety compliant computing in vehicle heterogeneous computing systems according to various embodiments. With reference to FIGS. 1A-5, the method 500 may be implemented in a processor (e.g., 164), a processing device (e.g., 300), and/or a control unit (e.g., 104) (variously referred to as a "processor") of a vehicle (e.g., 100) or a vehicle computing device 402. In some embodiments, the method 500 may be performed by one or more layers within a vehicle management system stack, such as a vehicle management stack 200, a vehicle management stack 250, etc. In other embodiments, the method 500 may be performed by a processor independently from, but in conjunction with, a vehicle control system stack, such as a vehicle management stack 200, a vehicle management stack 250, etc. For example, the method 500 may be implemented as a stand-alone software module or within dedicated hardware that monitors data and commands from/within the vehicle management system stack (e.g., vehicle management stack 200, 250, etc.) and is configured to take actions and store data as described.

In block 502, the processor may perform operations including receiving an indication to run a vehicle algorithm requiring safety compliance in the vehicle heterogeneous computing system. In various embodiments, an indication to run a vehicle algorithm requiring safety compliance in the vehicle heterogeneous computing system may be a notification received from a scheduler including an identifier of the vehicle algorithm requiring safety compliance.

In block 504, the processor may perform operations including determining whether a non-safety compliant computing unit of the vehicle heterogeneous computing system is preferred for running the vehicle algorithm. The determination that a non-safety compliant computing unit is preferred for running the algorithm, such as the vehicle algorithm, may be based on the nature of the algorithm. For example, algorithms requiring a series of parallel operations may be preferable for running on a GPU. As another example, highly vectorized algorithms may be preferable for running on a DSP. The determination of the computing unit may be controlled by a setting associated with the algorithm and/or may be determined at runtime for the algorithm based on the state of the computing units in the system (e.g., estimated latency, etc.), attributes of a data set to be run with the algorithm, or any other consideration.

In block 506, the processor may perform operations including modifying execution of the vehicle algorithm to perform a part of the vehicle algorithm using the non-safety compliant computing unit of the vehicle heterogeneous computing system and perform another portion of the vehicle algorithm using a safety compliant computing unit of the vehicle heterogeneous computing system in response to determining that the non-safety compliant computing unit of the vehicle heterogeneous computing system is preferred for running the vehicle algorithm. In some embodiments, modifying execution of the algorithm, such as the vehicle algorithm, may include creating a lighter version of the algorithm for running at least partially on the safety compliant computing unit of the heterogeneous computing system. The lighter version of the algorithm, such as a lighter version of the vehicle algorithm, may be a version that requires fewer computing resources to execute than a full version of the algorithm. For example, a full version of the vehicle algorithm, may use a grid or filter setting that is of a fine granularity (or that produces a higher resolution) and a lighter version of the vehicle algorithm may use a grid or filter setting that is of a coarser granularity (or that produces a lower resolution). In some embodiments, modifying execution of the algorithm may include identifying critical portions of a dataset. In various embodiments, critical portions of a dataset may be portions of a dataset likely to be associated with safety, such as grid sections including pedestrians, data related to avoiding accidents, etc. In some embodiments, modifying execution of the algorithm, such as a vehicle algorithm, may include generating a finer output for the identified critical portions of the dataset and running the algorithm on the non-safety compliant computing unit of the heterogeneous computing system, such as the vehicle heterogeneous computing system, to generate a finer output for all other portions of the dataset.

Figure 6:
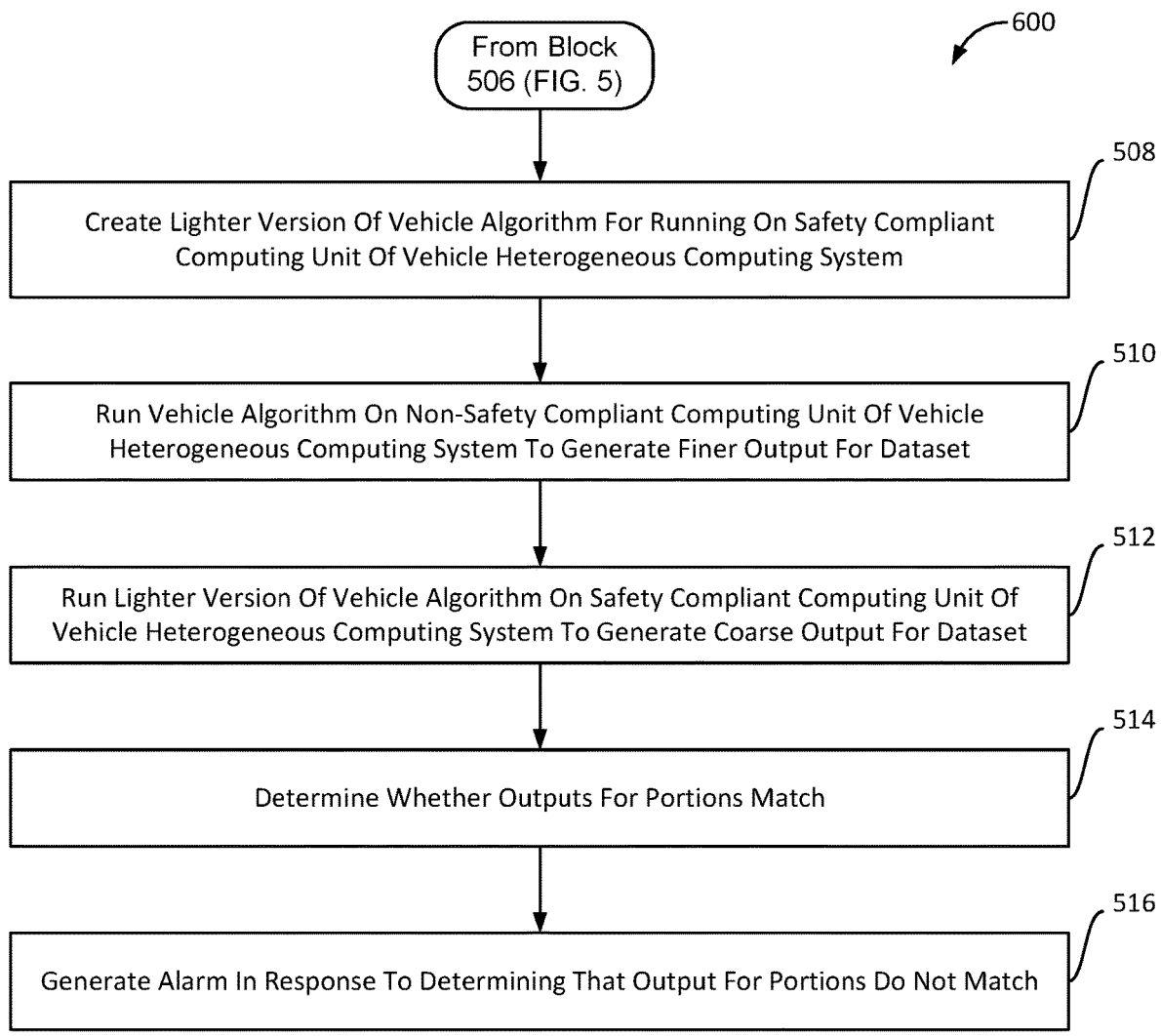
FIG. 6 is a process flow diagram illustrating a method of supporting safety compliant computing in a heterogeneous computing system, such as a vehicle heterogeneous computing system.

FIG. 6 illustrates a method 500 for supporting safety compliant computing in vehicle heterogeneous computing systems according to various embodiments. With reference to FIGS. 1A-6, the method 600 may be implemented in a processor (e.g., 164), a processing device (e.g., 300), and/or a control unit (e.g., 104) (variously referred to as a "processor") of a vehicle (e.g., 100) or a vehicle computing device 402. In some embodiments, the method 600 may be performed by one or more layers within a vehicle management system stack, such as a vehicle management stack 200, a vehicle management stack 250, etc. In other embodiments, the method 600 may be performed by a processor independently from, but in conjunction with, a vehicle control system stack, such as a vehicle management stack 200, a vehicle management stack 250, etc. For example, the method 600 may be implemented as a stand-alone software module or within dedicated hardware that monitors data and commands from/within the vehicle management system stack (e.g., vehicle management stack 200, 250, etc.) and is configured to take actions and store data as described. In various embodiments, the operations of method 600 may be performed in conjunction with the operations of method 500 (FIG. 5). In various embodiments, the operations of method 600 may be performed in response to, or as part of, operations to modify the execution of the vehicle algorithm in block 506.

In block 508, the processor may perform operations including modifying execution of the vehicle algorithm to create a lighter version of the vehicle algorithm for running on the safety compliant computing unit of the vehicle heterogeneous computing system. The lighter version of the algorithm may be a version of the algorithm that requires fewer computing resources to execute in comparison to a full version of the algorithm. For example, a full version of the vehicle algorithm may use a grid or filter setting that is of a fine granularity (or that produces a higher resolution) and a lighter version of the vehicle algorithm may use a grid or filter setting that is of a coarser granularity (or that produces a lower resolution).

In block 510, the processor may perform operations including running the vehicle algorithm on the non-safety compliant computing unit of the vehicle heterogeneous computing system to generate a finer output for a dataset. For example, running the vehicle algorithm on the non-safety compliant computing unit of the vehicle heterogeneous computing system to generate a finer output for a dataset may include running the vehicle algorithm with a grid or filter setting that is of a fine granularity (or that produces a higher resolution).

In block 512, the processor may perform operations including running the lighter version of the vehicle algorithm on the safety compliant computing unit of the vehicle heterogeneous computing system to generate a coarse output for the dataset. For example, running the lighter version of the vehicle algorithm on the safety compliant computing unit of the vehicle heterogeneous computing system to generate a coarse output for a dataset may include running the lighter version of the vehicle algorithm with a grid or filter setting that is of a coarse granularity (or that produces a lower resolution).

In block 514, the processor may perform operations including determining whether the finer output and the coarse output match. In various embodiments, determining whether the finer output and the coarse output match may include various operations to determine the portions that match, such as comparing the portions, computing hashes of the portions, etc.

In block 516, the processor may perform operations including generating an alarm in response to determining that the finer output and the coarse output do not match. For example, generating an alarm in response to determining that the finer output and the coarse output do not match may include sending a malfunction alarm to upper layers to notify the upper layers to take safety actions (e.g., warn the driver, perform evasive maneuvers, etc.).

Figure 7:
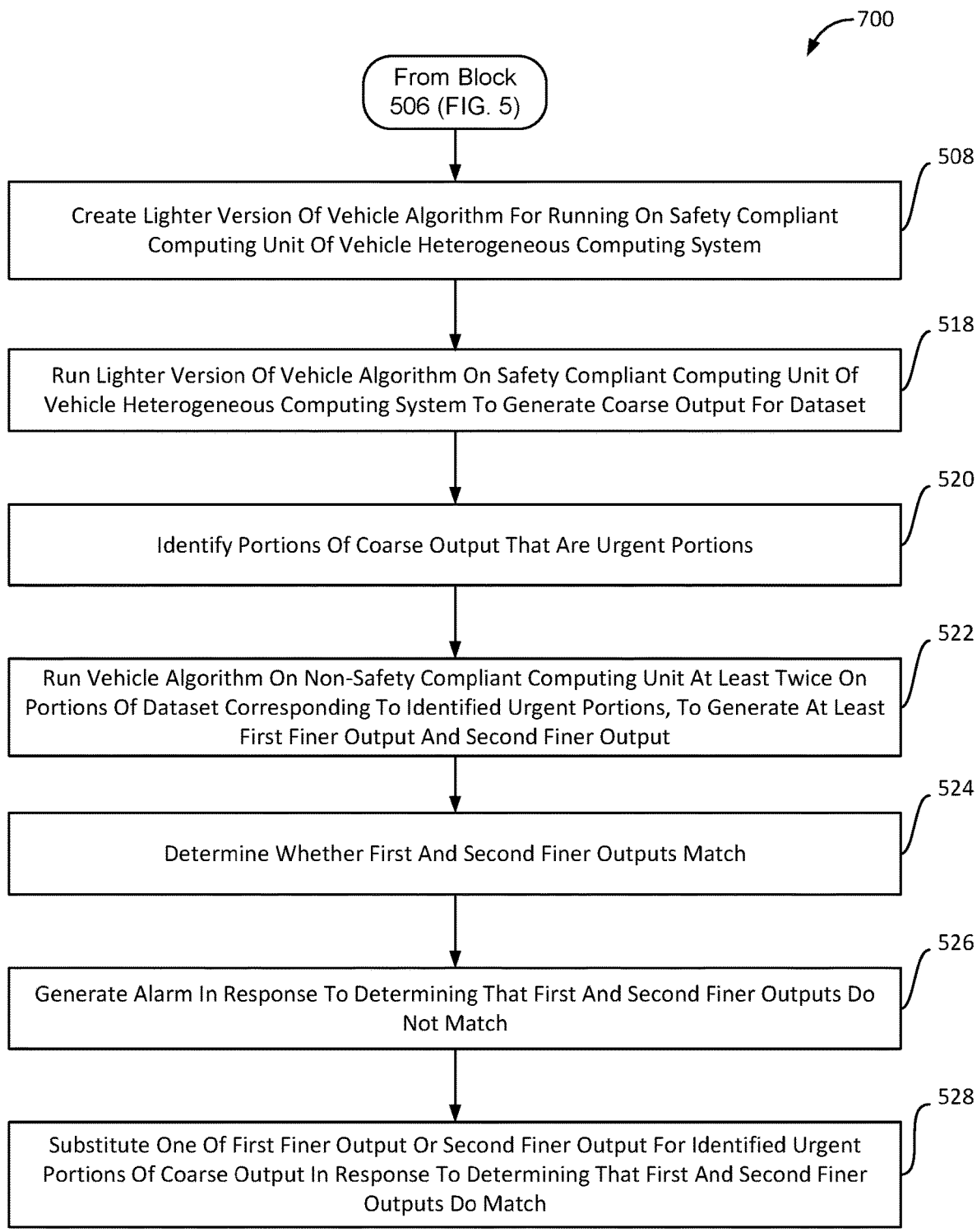
FIG. 7 is a process flow diagram illustrating a method of supporting safety compliant computing in a heterogeneous computing system, such as a vehicle heterogeneous computing system.

FIG. 7 illustrates a method 700 for supporting safety compliant computing in vehicle heterogeneous computing systems according to various embodiments. With reference to FIGS. 1A-7, the method 700 may be implemented in a processor (e.g., 164), a processing device (e.g., 300), and/or a control unit (e.g., 104) (variously referred to as a "processor") of a vehicle (e.g., 100) or a vehicle computing device 402. In some embodiments, the method 700 may be performed by one or more layers within a vehicle management system stack, such as a vehicle management stack 200, a vehicle management stack 250, etc. In other embodiments, the method 700 may be performed by a processor independently from, but in conjunction with, a vehicle control system stack, such as a vehicle management stack 200, a vehicle management stack 250, etc. For example, the method 700 may be implemented as a stand-alone software module or within dedicated hardware that monitors data and commands from/within the vehicle management system stack (e.g., vehicle management stack 200, 250, etc.) and is configured to take actions and store data as described. In various embodiments, the operations of method 700 may be performed in conjunction with the operations of method 500 (FIG. 5). In various embodiments, the operations of method 700 may be performed in response to, or as part of, operations to modify the execution of the vehicle algorithm in block 506.

In block 508, the processor may perform operations including modifying execution of the vehicle algorithm to create a lighter version of the vehicle algorithm for running on the safety compliant computing unit of the vehicle heterogeneous computing system as discussed with reference to the operations of method 600 (FIG. 6).

In block 518, the processor may perform operations including running the lighter version of the vehicle algorithm on the safety compliant computing unit of the vehicle heterogeneous computing system to generate a coarse output for a dataset. For example, running the lighter version of the vehicle algorithm on the safety compliant computing unit of the vehicle heterogeneous computing system to generate a coarse output for a dataset may include running the lighter version of the vehicle algorithm with a grid or filter setting that is of a coarse granularity (or that produces a lower resolution).

In block 520, the processor may perform operations including identifying portions of the coarse output that are urgent portions. In some embodiments, identifying portions of the coarse output that are urgent portions may include determining whether any portions of the coarse output are associated with objects requiring further monitoring, objects flagged as safety critical, or objects otherwise indicated as important. importance settings or safety settings. As a specific example, grid tiles that are urgent may be identified by determining that the grid tiles are associated with a pedestrian or small object.

In block 522, the processor may perform operations including running the vehicle algorithm on the non-safety compliant computing unit at least twice on portions of the dataset corresponding to identified urgent portions, to generate at least a first finer output and a second finer output. For example, the vehicle algorithm may be run on the urgent portions of the coarse output with a grid or filter setting that is of a fine granularity (or that produces a higher resolution) at least two separate times to generate at least a first finer output and a second finer output.

In block 524, the processor may perform operations including determining whether the first and the second finer outputs match. In various embodiments, determining whether the first and the second finer outputs match may include various operations to determine the outputs match, such as comparing the outputs, computing hashes of the outputs, etc.

In block 526, the processor may perform operations including generating an alarm in response to determining that the first and the second finer outputs do not match. For example, generating an alarm in response to determining that the first and the second finer outputs do not match may include sending a malfunction alarm to upper layers to notify the upper layers to take safety actions (e.g., warn the driver, perform evasive maneuvers, etc.).

In block 528, the processor may perform operations including substituting one of the first finer output or the second finer output for the identified urgent portions of the coarse output in response to determining that the first and the second finer outputs do match. For example, substituting one of the first finer output or the second finer output for the identified urgent portions of the coarse output in response to determining that the first and the second finer outputs do match may include replacing the coarse output data in the identified urgent portions with the first finer output data for that urgent portion or the second finer output data for that urgent portion.

Figure 8:
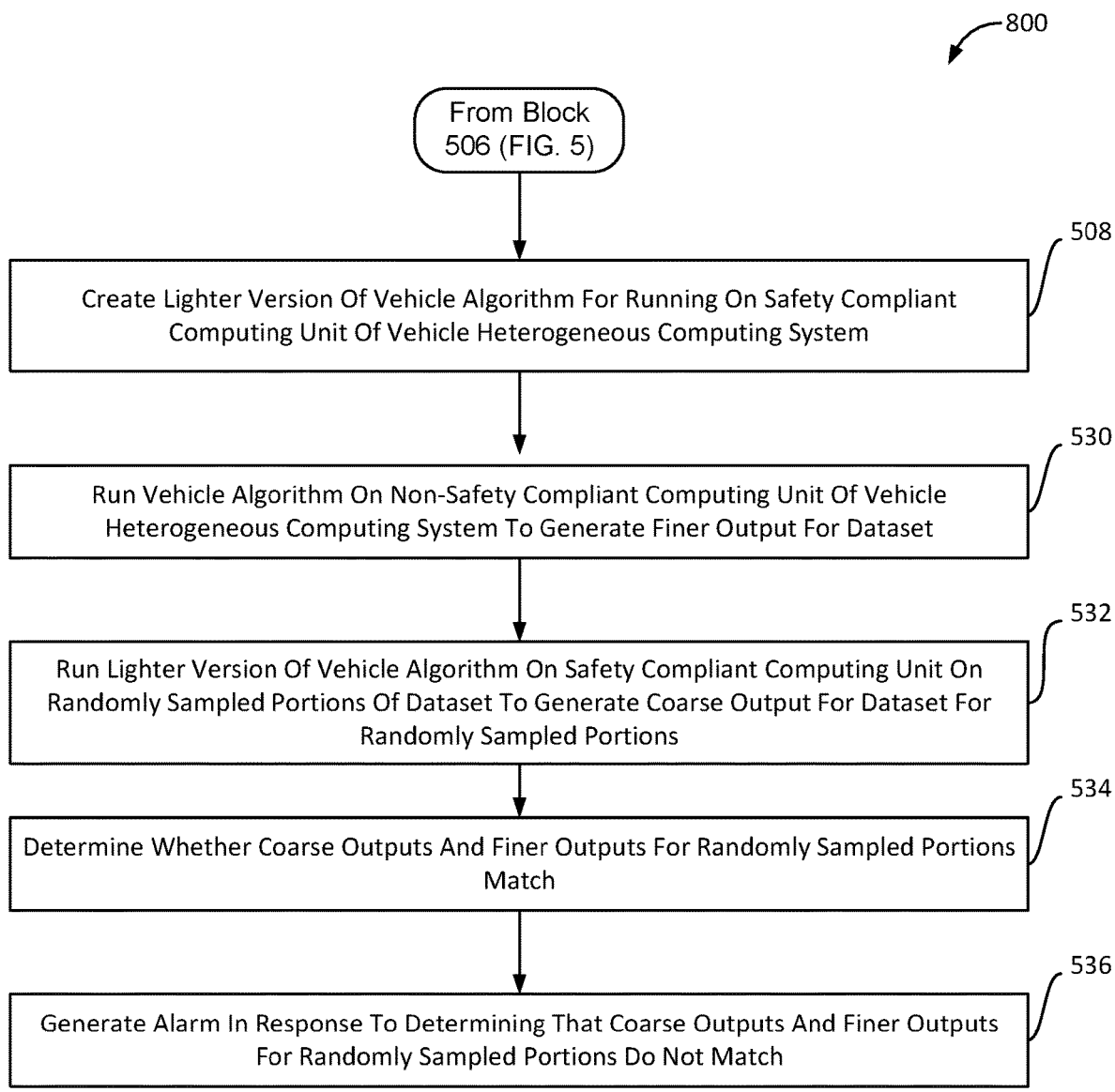
FIG. 8 is a process flow diagram illustrating a method of supporting safety compliant computing in a heterogeneous computing system, such as a vehicle heterogeneous computing system.

FIG. 8 illustrates a method 800 for supporting safety compliant computing in vehicle heterogeneous computing systems according to various embodiments. With reference to FIGS. 1A-8, the method 800 may be implemented in a processor (e.g., 164), a processing device (e.g., 300), and/or a control unit (e.g., 104) (variously referred to as a "processor") of a vehicle (e.g., 100) or a vehicle computing device 402. In some embodiments, the method 800 may be performed by one or more layers within a vehicle management system stack, such as a vehicle management stack 200, a vehicle management stack 250, etc. In other embodiments, the method 800 may be performed by a processor independently from, but in conjunction with, a vehicle control system stack, such as a vehicle management stack 200, a vehicle management stack 250, etc. For example, the method 800 may be implemented as a stand-alone software module or within dedicated hardware that monitors data and commands from/within the vehicle management system stack (e.g., vehicle management stack 200, 250, etc.) and is configured to take actions and store data as described. In various embodiments, the operations of method 800 may be performed in conjunction with the operations of method 500 (FIG. 5). In various embodiments, the operations of method 800 may be performed in response to, or as part of, operations to modify the execution of the vehicle algorithm in block 506.

In block 508, the processor may perform operations including modifying execution of the vehicle algorithm to create a lighter version of the vehicle algorithm for running on the safety compliant computing unit of the vehicle heterogeneous computing system as discussed with reference to the operations of method 600 (FIG. 6).

In block 530, the processor may perform operations including running the vehicle algorithm on the non-safety compliant computing unit of the vehicle heterogeneous computing system to generate a finer output for a dataset. For example, running the vehicle algorithm on the non-safety compliant computing unit of the vehicle heterogeneous computing system to generate a finer output for a dataset may include running the vehicle algorithm with a grid or filter setting that is of a fine granularity (or that produces a higher resolution).

In block 532, the processor may perform operations including running the lighter version of the vehicle algorithm on the safety compliant computing unit on randomly sampled portions of the dataset to generate a coarse output for the dataset for the randomly sampled portions. For example, running the lighter version of the vehicle algorithm on the safety compliant computing unit on randomly sampled portions of the dataset to generate a coarse output for the dataset for the randomly sampled portions may include running the lighter version of the vehicle algorithm one a random selected subset of the dataset with a grid or filter setting that is of a coarse granularity (or that produces a lower resolution).

In block 534, the processor may perform operations including determining whether the coarse outputs and the finer outputs for the randomly sampled portions match. In various embodiments, determining whether the coarse outputs and the finer outputs for the randomly sampled portions match may include various operations to determine the outputs match, such as comparing the outputs, computing hashes of the outputs, etc.

In block 536, the processor may perform operations including generating an alarm in response to determining that the coarse outputs and the finer outputs for the randomly sampled portions do not match. For example, generating an alarm in response to determining that the coarse outputs and the finer outputs for the randomly sampled portions do not match may include sending a malfunction alarm to upper layers to notify the upper layers to take safety actions (e.g., warn the driver, perform evasive maneuvers, etc.).

Figure 9:
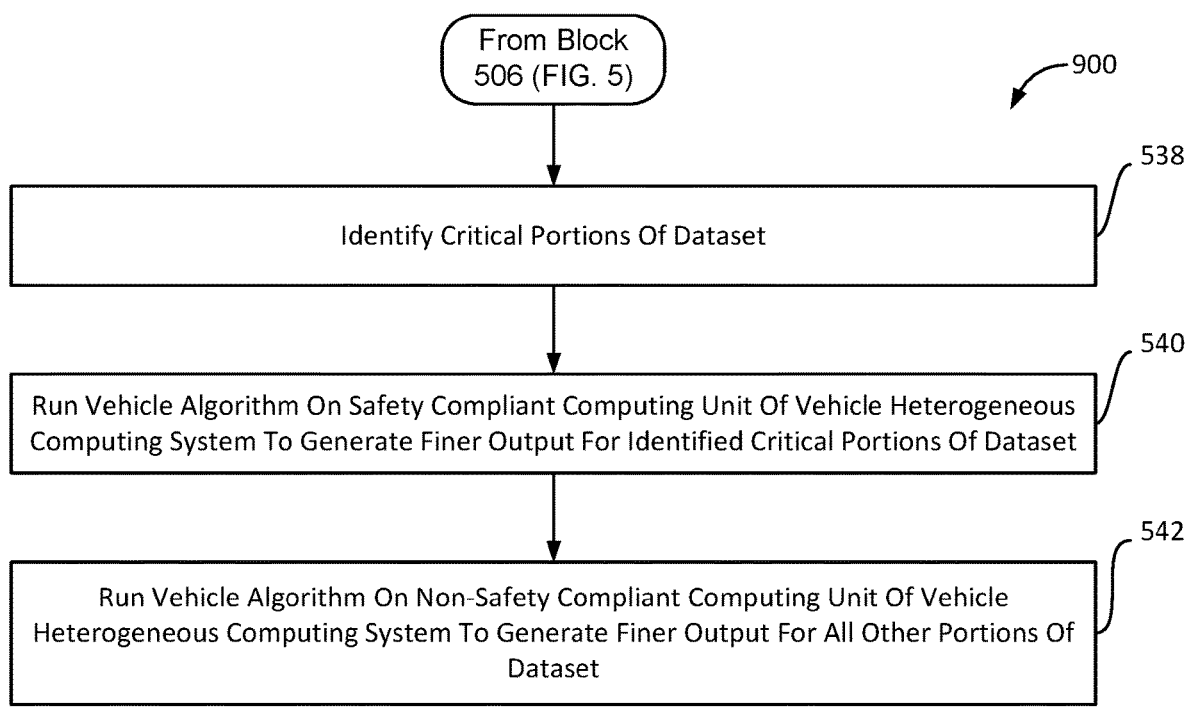
FIG. 9 is a process flow diagram illustrating a method of supporting safety compliant computing in a heterogeneous computing system, such as a vehicle heterogeneous computing system.

FIG. 9 illustrates a method 900 for supporting safety compliant computing in vehicle heterogeneous computing systems according to various embodiments. With reference to FIGS. 1A-9, the method 900 may be implemented in a processor (e.g., 164), a processing device (e.g., 300), and/or a control unit (e.g., 104) (variously referred to as a "processor") of a vehicle (e.g., 100) or a vehicle computing device 402. In some embodiments, the method 900 may be performed by one or more layers within a vehicle management system stack, such as a vehicle management stack 200, a vehicle management stack 250, etc. In other embodiments, the method 900 may be performed by a processor independently from, but in conjunction with, a vehicle control system stack, such as a vehicle management stack 200, a vehicle management stack 250, etc. For example, the method 900 may be implemented as a stand-alone software module or within dedicated hardware that monitors data and commands from/within the vehicle management system stack (e.g., vehicle management stack 200, 250, etc.) and is configured to take actions and store data as described. In various embodiments, the operations of method 900 may be performed in conjunction with the operations of method 500 (FIG. 5). In various embodiments, the operations of method 900 may be performed in response to, or as part of, operations to modify the execution of the vehicle algorithm in block 506.

In block 538, the processor may perform operations including identifying critical portions of a dataset. In some embodiments, critical portions of a dataset may be portions of a dataset likely to be associated with safety, such as grid sections including pedestrians, data related to avoiding accidents, etc.

In block 540, the processor may perform operations including running the vehicle algorithm on the safety compliant computing unit of the vehicle heterogeneous computing system to generate a finer output for the identified critical portions of the dataset. For example, the vehicle algorithm may be run on the safety compliant computing unit of the vehicle heterogeneous computing system with a grid or filter setting that is of a fine granularity (or that produces a higher resolution) for the identified critical portions of the data set to produce a finer output for the identified critical portions of the dataset.

In block 542, the processor may perform operations including running the vehicle algorithm on the non-safety compliant computing unit of the vehicle heterogeneous computing system to generate a finer output for all other portions of the dataset. For example, the vehicle algorithm may be run on the non-safety compliant computing unit of the vehicle heterogeneous computing system with a grid or filter setting that is of a fine granularity (or that produces a higher resolution) for all non-critical portions of the data set to produce a finer output for all other portions of the dataset.

Figure 10:
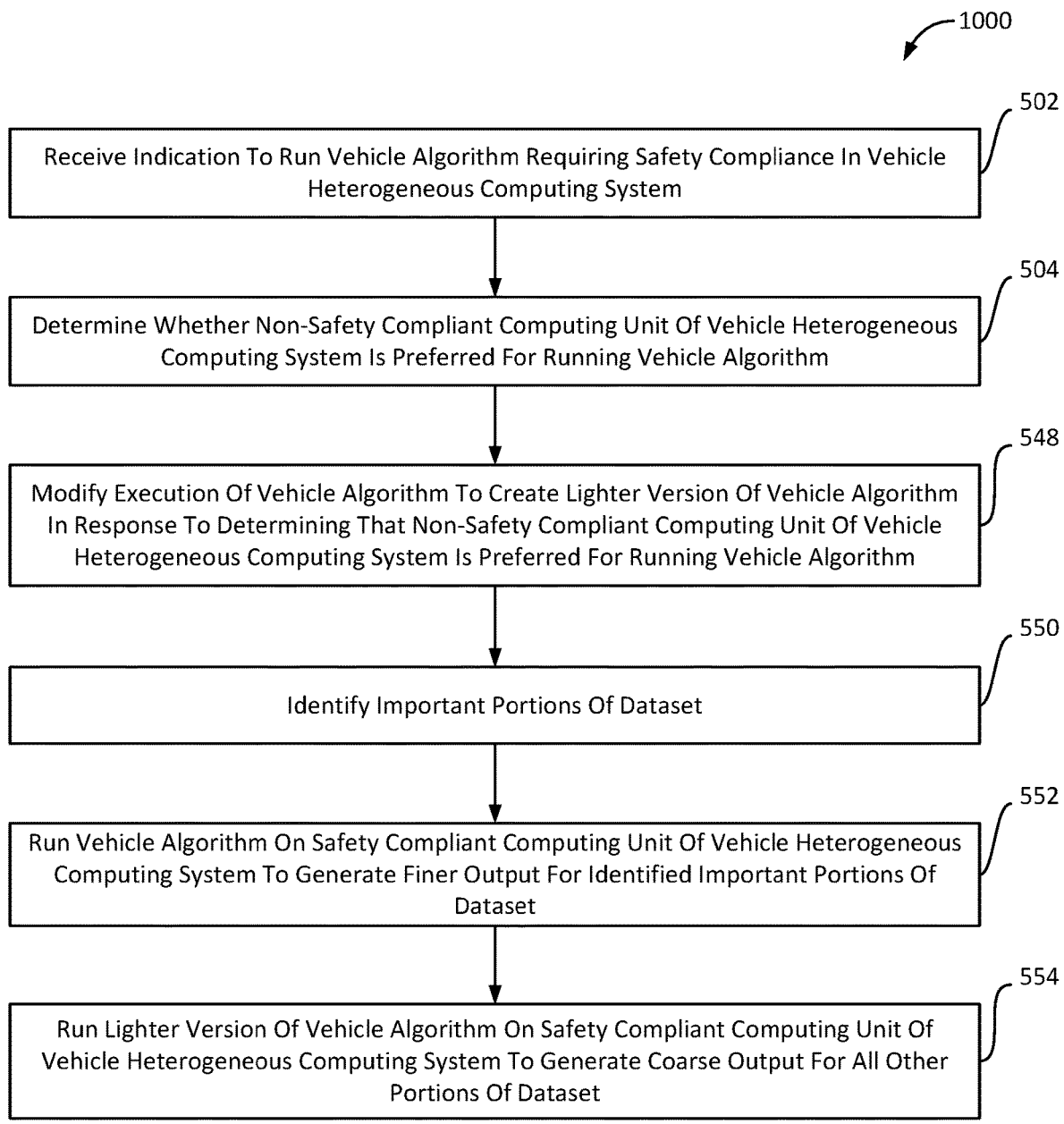
FIG. 10 is a process flow diagram illustrating a method of supporting safety compliant computing in a heterogeneous computing system, such as a vehicle heterogeneous computing system.

FIG. 10 illustrates a method 1000 for supporting safety compliant computing in vehicle heterogeneous computing systems according to various embodiments. With reference to FIGS. 1A-10, the method 1000 may be implemented in a processor (e.g., 164), a processing device (e.g., 300), and/or a control unit (e.g., 104) (variously referred to as a "processor") of a vehicle (e.g., 100) or a vehicle computing device 402. In some embodiments, the method 1000 may be performed by one or more layers within a vehicle management system stack, such as a vehicle management stack 200, a vehicle management stack 250, etc. In other embodiments, the method 1000 may be performed by a processor independently from, but in conjunction with, a vehicle control system stack, such as a vehicle management stack 200, a vehicle management stack 250, etc. For example, the method 1000 may be implemented as a stand-alone software module or within dedicated hardware that monitors data and commands from/within the vehicle management system stack (e.g., vehicle management stack 200, 250, etc.) and is configured to take actions and store data as described.

In block 502, the processor may perform operations including receiving an indication to run a vehicle algorithm requiring safety compliance in the vehicle heterogeneous computing system as discussed with reference to the operations of method 500 (FIG. 5).

In block 504, the processor may perform operations including determining whether a non-safety compliant computing unit of the vehicle heterogeneous computing system is preferred for running the vehicle algorithm as discussed with reference to the operations of method 500 (FIG. 5).

In block 548, the processor may perform operations including modifying execution of the vehicle algorithm to create a lighter version of the vehicle algorithm in response to determining that the non-safety compliant computing unit of the vehicle heterogeneous computing system is preferred for running the vehicle algorithm. The lighter version of the algorithm, such as the lighter version of the vehicle algorithm, may be a version of the algorithm that requires fewer computing resources to execute than a full version of the algorithm. For example, a full version of the vehicle algorithm may use a grid or filter setting that is of a fine granularity (or that produces a higher resolution) and a lighter version of the algorithm, such as the lighter version of the vehicle algorithm, may use a grid or filter setting that is of a coarser granularity (or that produces a lower resolution).

In block 550, the processor may perform operations including identifying important portions of a dataset. In some embodiments, important portions of a dataset may be portions of a dataset associated with importance settings, such as importance thresholds, object types identified as important, etc.

In block 552, the processor may perform operations including running the vehicle algorithm on the safety compliant computing unit of the vehicle heterogeneous computing system to generate a finer output for the identified important portions of the dataset. For example, the vehicle algorithm may be run on the safety compliant computing unit of the vehicle heterogeneous computing system with a grid or filter setting that is of a fine granularity (or that produces a higher resolution) for the identified important portions of the data set to produce a finer output for the identified important portions of the dataset.

In block 554, the processor may perform operations including running the lighter version of the vehicle algorithm on the safety compliant computing unit of the vehicle heterogeneous computing system to generate a coarse output for all other portions of the dataset. For example, the lighter vehicle algorithm may be run on the non-safety compliant computing unit of the vehicle heterogeneous computing system with a grid or filter setting that is of a coarse granularity (or that produces a lower resolution) for all non-important portions of the data set to produce a coarse output for all other portions of the dataset.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method for supporting safety compliant computing in a heterogeneous computing system, comprising:
receiving an indication to run an algorithm requiring safety compliance in the heterogeneous computing system;
determining whether a non-safety compliant computing unit of the heterogeneous computing system is preferred for running the algorithm;
modifying execution of the algorithm to perform a portion of the algorithm using the non-safety compliant computing unit of the heterogeneous computing system and perform another portion of the algorithm using a safety compliant computing unit of the heterogeneous computing system in response to determining that the non-safety compliant computing unit of the heterogeneous computing system is preferred for running the algorithm; and
modifying execution of the algorithm to create a lighter version of the algorithm for running on the safety compliant computing unit of the heterogeneous computing system.

2. The method of claim 1, further comprising:
running the algorithm on the non-safety compliant computing unit of the heterogeneous computing system to generate a finer output for a dataset;
running the lighter version of the algorithm on the safety compliant computing unit of the heterogeneous computing system to generate a coarse output for the dataset;
determining whether the finer output and the coarse output match; and
generating an alarm in response to determining that the finer output and the coarse output do not match.

3. The method of claim 1, further comprising:
running the algorithm on the non-safety compliant computing unit of the heterogeneous computing system to generate a finer output for a dataset;
running the lighter version of the algorithm on the safety compliant computing unit on randomly sampled portions of the dataset to generate a coarse output for the dataset for the randomly sampled portions;
determining whether the coarse outputs and the finer outputs for the randomly sampled portions match; and
generating an alarm in response to determining that the coarse outputs and the finer outputs for the randomly sampled portions do not match.

4. The method of claim 1, further comprising:
identifying important portions of a dataset;
running the algorithm on the safety compliant computing unit of the heterogeneous computing system to generate a finer output for the identified important portions of the dataset; and
running the lighter version of the algorithm on the safety compliant computing unit of the heterogeneous computing system to generate a coarse output for all other portions of the dataset.

5. The method of claim 1, wherein modifying execution of the algorithm to perform a portion of the algorithm using the non-safety compliant computing unit of the heterogeneous computing system and perform another portion of the algorithm using a safety compliant computing unit of the heterogeneous computing system comprises:
identifying critical portions of a dataset;
running the algorithm on the safety compliant computing unit of the heterogeneous computing system to generate a finer output for the identified critical portions of the dataset; and
running the algorithm on the non-safety compliant computing unit of the heterogeneous computing system to generate a finer output for all other portions of the dataset.

6. The method of claim 1, wherein the heterogeneous computing system is a system-on-chip.

7. The method of claim 1, wherein the safety compliant computing unit is a central processing unit or a digital signal processing unit and the non-safety compliant computing unit is a graphics processing unit.

8. The method claim 1, wherein the heterogeneous computing system is a vehicle heterogeneous computing system and the algorithm requiring safety compliance is a vehicle algorithm requiring safety compliance.

9. The method of claim 8, wherein the vehicle algorithm requiring safety compliance is a vehicle algorithm requiring automotive safety integrity level B (ASIL B) compliance.

10. A vehicle computing device, comprising:
a processor configured with processor-executable instructions to:
receive an indication to run an algorithm requiring safety compliance in a heterogeneous computing system;
determine whether a non-safety compliant computing unit of the heterogeneous computing system is preferred for running the algorithm;
modify execution of the algorithm to perform a portion of the algorithm using the non-safety compliant computing unit of the heterogeneous computing system and perform another portion of the algorithm using a safety compliant computing unit of the heterogeneous computing system in response to determining that the non-safety compliant computing unit of the heterogeneous computing system is preferred for running the algorithm; and
modify execution of the algorithm to create a lighter version of the algorithm for running on the safety compliant computing unit of the heterogeneous computing system.

11. The vehicle computing device of claim 10, wherein the processor is further configured with processor-executable instructions to:
- run the algorithm on the non-safety compliant computing unit of the heterogeneous computing system to generate a finer output for a dataset;
- run the lighter version of the algorithm on the safety compliant computing unit of the heterogeneous computing system to generate a coarse output for the dataset;
- determining whether the finer output and the coarse output match; and
- generate an alarm in response to determining that the finer output and the coarse output do not match.

12. The vehicle computing device of claim 10, wherein the processor is further configured with processor-executable instructions to:
- run the algorithm on the non-safety compliant computing unit of the heterogeneous computing system to generate a finer output for a dataset;
- run the lighter version of the algorithm on the safety compliant computing unit on randomly sampled portions of the dataset to generate a coarse output for the dataset for the randomly sampled portions;
- determine whether the coarse outputs and the finer outputs for the randomly sampled portions match; and
- generate an alarm in response to determining that the coarse outputs and the finer outputs for the randomly sampled portions do not match.

13. The vehicle computing device of claim 10, wherein the processor is further configured with processor-executable instructions to:
- identify important portions of a dataset;
- run the algorithm on the safety compliant computing unit of the heterogeneous computing system to generate a finer output for the identified important portions of the dataset; and
- run the lighter version of the algorithm on the safety compliant computing unit of the heterogeneous computing system to generate a coarse output for all other portions of the dataset.

14. The vehicle computing device of claim 10, wherein the processor is further configured with processor-executable instructions to modify execution of the algorithm to perform a portion of the algorithm using the non-safety compliant computing unit of the heterogeneous computing system and perform another portion of the algorithm using a safety compliant computing unit of the heterogeneous computing system by:
- identifying critical portions of a dataset;
- running the algorithm on the safety compliant computing unit of the heterogeneous computing system to generate a finer output for the identified critical portions of the dataset; and
- running the algorithm on the non-safety compliant computing unit of the heterogeneous computing system to generate a finer output for all other portions of the dataset.

15. The vehicle computing device of claim 10, wherein the processor is further configured with processor-executable instructions such that the safety compliant computing unit is a central processing unit or a digital signal processing unit and the non-safety compliant computing unit is a graphics processing unit.

16. The vehicle computing device of claim 10, wherein the processor is further configured with processor-executable instructions such that the algorithm requiring safety compliance is a vehicle algorithm requiring automotive safety integrity level B (ASIL B) compliance.

17. A non-transitory processor readable medium having stored thereon processor-executable instructions configured to cause a processor of a vehicle computing device to perform operations comprising:
- receiving an indication to run an algorithm requiring safety compliance in a heterogeneous computing system;
- determining whether a non-safety compliant computing unit of the heterogeneous computing system is preferred for running the algorithm;
- modifying execution of the algorithm to perform a portion of the algorithm using the non-safety compliant computing unit of the heterogeneous computing system and perform another portion of the algorithm using a safety compliant computing unit of the heterogeneous computing system in response to determining that the non-safety compliant computing unit of the heterogeneous computing system is preferred for running the algorithm; and
- modifying execution of the algorithm to create a lighter version of the algorithm for running on the safety compliant computing unit of the heterogeneous computing system.

18. The non-transitory processor readable medium of claim 17, wherein the stored processor-executable instructions are configured to cause a processor of a vehicle computing device to perform operations further comprising:
- running the algorithm on the non-safety compliant computing unit of the heterogeneous computing system to generate a finer output for a dataset;
- running the lighter version of the algorithm on the safety compliant computing unit of the heterogeneous computing system to generate a coarse output for the dataset;
- determining whether the finer output and the coarse output match; and
- generating an alarm in response to determining that the finer output and the coarse output do not match.

19. The non-transitory processor readable medium of claim 17, wherein the stored processor-executable instructions are configured to cause a processor of a vehicle computing device to perform operations further comprising:
- running the algorithm on the non-safety compliant computing unit of the heterogeneous computing system to generate a finer output for a dataset;
- running the lighter version of the algorithm on the safety compliant computing unit on randomly sampled portions of the dataset to generate a coarse output for the dataset for the randomly sampled portions;
- determining whether the coarse outputs and the finer outputs for the randomly sampled portions match; and
- generating an alarm in response to determining that the coarse outputs and the finer outputs for the randomly sampled portions do not match.

20. The non-transitory processor readable medium of claim 17, wherein the stored processor-executable instructions are configured to cause a processor of a vehicle computing device to perform operations further comprising:
- identifying important portions of a dataset;
- running the algorithm on the safety compliant computing unit of the heterogeneous computing system to generate a finer output for the identified important portions of the dataset; and running the lighter version of the algorithm on the safety compliant computing unit of the heterogeneous computing system to generate a coarse output for all other portions of the dataset.

21. The non-transitory processor readable medium of claim 17, wherein the stored processor-executable instructions are configured to cause a processor of a vehicle computing device to perform operations such that modifying execution of the algorithm to perform a portion of the algorithm using the non-safety compliant computing unit of the heterogeneous computing system and perform another portion of the algorithm using a safety compliant computing unit of the heterogeneous computing system comprises:
   identifying critical portions of a dataset;
   running the algorithm on the safety compliant computing unit of the heterogeneous computing system to generate a finer output for the identified critical portions of the dataset; and
   running the algorithm on the non-safety compliant computing unit of the heterogeneous computing system to generate a finer output for all other portions of the dataset.

22. The non-transitory processor readable medium of claim 17, wherein the stored processor-executable instructions are configured to cause a processor of a vehicle computing device to perform operations such that the safety compliant computing unit is a central processing unit or a digital signal processing unit and the non-safety compliant computing unit is a graphics processing unit.

23. The non-transitory processor readable medium of claim 17, wherein the stored processor-executable instructions are configured to cause a processor of a vehicle computing device to perform operations such that the algorithm requiring safety compliance is a vehicle algorithm requiring automotive safety integrity level B (ASIL B) compliance.

24. A vehicle computing device, comprising:
   means for receive an indication to run an algorithm requiring safety compliance in a heterogeneous computing system;
   means for determining whether a non-safety compliant computing unit of the heterogeneous computing system is preferred for running the algorithm;
   means for modifying execution of the algorithm to perform a portion of the algorithm using the non-safety compliant computing unit of the heterogeneous computing system and perform another portion of the algorithm using a safety compliant computing unit of the heterogeneous computing system in response to determining that the non-safety compliant computing unit of the heterogeneous computing system is preferred for running the algorithm; and
   means for modifying execution of the algorithm to create a lighter version of the algorithm for running on the safety compliant computing unit of the heterogeneous computing system.

* * * * *